US008868122B2

(12) United States Patent
Taoka et al.

(10) Patent No.: US 8,868,122 B2
(45) Date of Patent: Oct. 21, 2014

(54) USER APPARATUS, BASE STATION APPARATUS AND COMMUNICATION CONTROL METHOD

(75) Inventors: Hidekazu Taoka, Nerima-ku (JP); Teruo Kawamura, Yokosuka (JP); Nobuhiko Miki, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 617 days.

(21) Appl. No.: 13/060,595

(22) PCT Filed: Aug. 7, 2009

(86) PCT No.: PCT/JP2009/064005
§ 371 (c)(1), (2), (4) Date: May 12, 2011

(87) PCT Pub. No.: WO2010/024107
PCT Pub. Date: Mar. 4, 2010

(65) Prior Publication Data
US 2011/0207493 A1 Aug. 25, 2011

(30) Foreign Application Priority Data
Aug. 25, 2008 (JP) .................. 2008-215930

(51) Int. Cl.
*H04B 7/00* (2006.01)
*H04W 52/28* (2009.01)
(Continued)

(52) U.S. Cl.
CPC ............. *H04W 52/28* (2013.01); *H04L 5/0064* (2013.01); *H04W 52/262* (2013.01); *H04L*
(Continued)

(58) Field of Classification Search
CPC .............................. H04B 3/59; H04L 27/2647
USPC ........................................................ 455/509
See application file for complete search history.

(56) References Cited

U.S. PATENT DOCUMENTS 5,524,026 A * 6/1996 Murata ......................... 375/329
6,175,550 B1 * 1/2001 van Nee ........................ 370/206
(Continued)

FOREIGN PATENT DOCUMENTS

WO 2006/109492 A1 10/2006
WO 2007/029406 A1 3/2007

OTHER PUBLICATIONS

International Search Report w/translation from PCT/JP2009/064005 dated Nov. 10, 2009 (2 pages).
(Continued)

*Primary Examiner* — Hai V Nguyen
(74) *Attorney, Agent, or Firm* — Osha Liang LLP

(57) ABSTRACT

A user apparatus to which radio access schemes that are a single-carrier scheme and a multicarrier scheme are applied, includes: a radio access scheme setting unit configured to set a radio access scheme; a discrete Fourier transform unit configured to perform discrete Fourier transform on a modulated symbol sequence when the set radio access scheme is the single-carrier scheme; a serial parallel conversion unit configured to perform serial parallel conversion on a modulated symbol sequence when the set radio access scheme is the multicarrier scheme; a frequency domain signal generation unit configured to assign a radio resource to the modulated symbol sequence on which discrete Fourier transform has been performed or to the modulated symbol sequence on which serial parallel conversion has been performed to generate a frequency domain signal; a transmission signal generation unit configured to perform inverse fast Fourier transform on the frequency domain signal to generate a transmission signal; a transmission power control unit configured to perform transmission power control according to the set radio access scheme; and an RF unit configured to convert the transmission signal to a radio frequency, and to transmit the transmission signal by performing the transmission power control.

30 Claims, 9 Drawing Sheets

(51) Int. Cl.
*H04L 27/00* (2006.01)
*H04L 27/26* (2006.01)
*H04L 5/00* (2006.01)
*H04W 52/26* (2009.01)
*H04W 52/22* (2009.01)
*H04W 52/36* (2009.01)

(52) U.S. Cl.
CPC .. 5/0066 (2013.01); *H04L 27/0008* (2013.01); *H04W 52/226* (2013.01); *H04L 27/2628* (2013.01); *H04L 5/0028* (2013.01); *H04L 5/0023* (2013.01); *H04W 52/367* (2013.01); *H04L 5/0092* (2013.01); *H04L 5/0007* (2013.01); *H04L 27/2614* (2013.01)
USPC ............ 455/522; 455/509; 375/259; 375/260

(56) References Cited

U.S. PATENT DOCUMENTS

| | | | | |
|---|---|---|---|---|
| 6,535,739 B1* | 3/2003 | Chen et al. | ............... | 455/437 |
| 6,563,786 B1* | 5/2003 | Nee | ............... | 370/208 |
| 6,754,195 B2* | 6/2004 | Webster et al. | ............... | 370/335 |
| 6,937,558 B2* | 8/2005 | Wakutsu | ............... | 370/208 |
| 6,999,446 B2* | 2/2006 | Hall et al. | ............... | 370/349 |
| 7,016,425 B1* | 3/2006 | Kraiem | ............... | 375/261 |
| 7,085,327 B2* | 8/2006 | Parker et al. | ............... | 375/260 |
| 7,127,005 B2* | 10/2006 | Wight | ............... | 375/295 |
| 7,161,987 B2* | 1/2007 | Webster et al. | ............... | 375/260 |
| 7,170,880 B2* | 1/2007 | Webster et al. | ............... | 370/338 |
| 7,190,683 B2* | 3/2007 | Giallorenzi et al. | ............... | 370/335 |
| 7,206,359 B2* | 4/2007 | Kjeldsen et al. | ............... | 375/316 |
| 7,386,063 B1* | 6/2008 | Husted | ............... | 375/316 |
| 7,397,860 B1* | 7/2008 | Duvaut et al. | ............... | 375/260 |
| 7,701,903 B2* | 4/2010 | Proctor, Jr. | ............... | 370/329 |
| 7,715,492 B2* | 5/2010 | Seki | ............... | 375/295 |
| 7,724,637 B2* | 5/2010 | Gardner | ............... | 370/204 |
| 7,733,976 B2* | 6/2010 | Wight | ............... | 375/295 |
| 7,787,551 B2* | 8/2010 | Parker et al. | ............... | 375/261 |
| 7,860,057 B2* | 12/2010 | Seki et al. | ............... | 370/330 |
| 7,944,980 B2* | 5/2011 | Qu et al. | ............... | 375/260 |
| 7,948,868 B2* | 5/2011 | Sahlman | ............... | 370/210 |
| 7,961,800 B2* | 6/2011 | Yoshida | ............... | 375/260 |
| 8,045,447 B2* | 10/2011 | Bitran et al. | ............... | 370/208 |
| 8,045,631 B2* | 10/2011 | Huang et al. | ............... | 375/260 |
| 8,098,567 B2* | 1/2012 | Brehler et al. | ............... | 370/203 |
| 8,135,085 B2* | 3/2012 | Lee et al. | ............... | 375/267 |
| 8,175,177 B2* | 5/2012 | Wang | ............... | 375/260 |
| 8,229,015 B2* | 7/2012 | Takai et al. | ............... | 375/267 |
| RE43,670 E* | 9/2012 | Webster et al. | ............... | 375/260 |
| 8,280,392 B2* | 10/2012 | Iwamura et al. | ............... | 455/452.1 |
| 8,320,493 B2* | 11/2012 | Matsushita et al. | ............... | 375/268 |
| 8,335,276 B2* | 12/2012 | Cho et al. | ............... | 375/295 |
| 8,340,056 B2* | 12/2012 | Siriwongpairat et al. | .... | 370/337 |
| 8,351,553 B2* | 1/2013 | Yoshida et al. | ............... | 375/347 |
| 8,400,909 B2* | 3/2013 | Ofuji et al. | ............... | 370/210 |
| 8,452,238 B2* | 5/2013 | Nakajima | ............... | 455/63.1 |
| 8,457,224 B2* | 6/2013 | Kimata | ............... | 375/260 |
| 8,498,347 B2* | 7/2013 | Kawamura et al. | ............... | 375/260 |
| 8,526,511 B2* | 9/2013 | Kawamura et al. | ............... | 375/259 |
| 8,559,297 B2* | 10/2013 | Kawamura et al. | ............... | 370/210 |
| 8,570,910 B2* | 10/2013 | Iwai et al. | ............... | 370/260 |
| 8,605,754 B2* | 12/2013 | Siriwongpairat et al. | .... | 370/474 |
| 8,630,359 B2* | 1/2014 | Jitsukawa et al. | ............... | 375/260 |
| 2003/0053413 A1* | 3/2003 | Sawahashi et al. | ............... | 370/208 |
| 2003/0231714 A1* | 12/2003 | Kjeldsen et al. | ............... | 375/259 |
| 2004/0125740 A1* | 7/2004 | Gardner | ............... | 370/208 |
| 2006/0109931 A1* | 5/2006 | Asai et al. | ............... | 375/299 |
| 2007/0004465 A1* | 1/2007 | Papasakellariou et al. | ... | 455/571 |
| 2007/0202904 A1* | 8/2007 | Cheng et al. | ............... | 455/509 |
| 2007/0263738 A1* | 11/2007 | Jitsukawa et al. | ............... | 375/260 |
| 2007/0280365 A1* | 12/2007 | Seki | ............... | 375/260 |
| 2008/0002645 A1* | 1/2008 | Seki et al. | ............... | 370/338 |
| 2008/0045271 A1* | 2/2008 | Azuma | ............... | 455/561 |
| 2008/0075195 A1* | 3/2008 | Pajukoski et al. | ............... | 375/298 |
| 2008/0187069 A1* | 8/2008 | Qu et al. | ............... | 375/295 |
| 2008/0205533 A1* | 8/2008 | Lee et al. | ............... | 375/260 |
| 2008/0298316 A1* | 12/2008 | Bitran et al. | ............... | 370/329 |
| 2008/0310545 A1* | 12/2008 | Webster et al. | ............... | 375/295 |
| 2009/0044082 A1* | 2/2009 | Landau et al. | ............... | 714/790 |
| 2009/0097584 A1* | 4/2009 | Takai et al. | ............... | 375/267 |
| 2009/0147748 A1 | 6/2009 | Ofuji et al. | | |
| 2009/0170500 A1* | 7/2009 | Terabe et al. | ............... | 455/423 |
| 2009/0175369 A1* | 7/2009 | Atarashi et al. | ............... | 375/260 |
| 2009/0201846 A1* | 8/2009 | Horn et al. | ............... | 370/315 |
| 2009/0220017 A1* | 9/2009 | Kawamura et al. | ............... | 375/260 |
| 2009/0232194 A1 | 9/2009 | Yoshida | | |
| 2010/0008287 A1* | 1/2010 | Lin et al. | ............... | 370/315 |
| 2010/0040009 A1* | 2/2010 | Gaal et al. | ............... | 370/329 |
| 2010/0091919 A1* | 4/2010 | Xu et al. | ............... | 375/346 |
| 2010/0113054 A1* | 5/2010 | Iwamura et al. | ............... | 455/452.1 |
| 2010/0290407 A1* | 11/2010 | Uemura | ............... | 370/329 |
| 2010/0290544 A1* | 11/2010 | Kawamura et al. | ............... | 375/260 |
| 2011/0007792 A1* | 1/2011 | Kimata | ............... | 375/232 |
| 2011/0075641 A1* | 3/2011 | Siriwongpairat et al. | .... | 370/337 |
| 2011/0075651 A1* | 3/2011 | Jia et al. | ............... | 370/344 |
| 2011/0110459 A1* | 5/2011 | Abraham | ............... | 375/295 |
| 2011/0164532 A1* | 7/2011 | Kawamura et al. | ............... | 370/254 |
| 2011/0235745 A1* | 9/2011 | Laroia et al. | ............... | 375/295 |
| 2011/0235746 A1* | 9/2011 | Laroia et al. | ............... | 375/295 |
| 2011/0319116 A1* | 12/2011 | Iwamura et al. | ............... | 455/517 |
| 2012/0171963 A1* | 7/2012 | Tsfaty | ............... | 455/41.3 |
| 2012/0210186 A1* | 8/2012 | Landau et al. | ............... | 714/748 |
| 2013/0003627 A1* | 1/2013 | Kravtsov | ............... | 370/311 |
| 2013/0107813 A1* | 5/2013 | Siriwongpairat et al. | .... | 370/328 |

OTHER PUBLICATIONS

Written Opinion from PCT/JP2009/064005 dated Nov. 10, 2009 (4 pages).
R. Dinis et al.; "A Multiple Access Scheme for the Uplink of Broadband Wireless Systems"; IEEE Communications Society, Globecom 2004; pp. 3808-3812 (5 pages).
Extended European Search Report for Application No. 09809761.1, mailed on Jun. 5, 2014 (9 pages).
Rejection Decision in a counterpart Chinese Patent Application No. 200980141310.2 issued Jul. 8, 2014 (19 pages).

* cited by examiner

FIG.4

| ACCESS SCHEME | SINGLE-CARRIER SCHEME | MULTICARRIER SCHEME |
|---|---|---|
| ROLL-OFF RATE | LARGE ⟷ SMALL | 0 |
| PAPR (COVERAGE AREA) | SMALL ⟷ WIDE | LARGE ⟷ NARROW |
| PEAK DATA RATE | SMALL | LARGE |

FIG.8

| | SINR = 0 dB | SINR = 1 dB | ..... | SINR = 29 dB | SINR = 30 dB |
|---|---|---|---|---|---|
| OFDM | MCS0 | MCS1 | ..... | MCS29 | MCS30 |
| SC-FDMA | MCS0' | MCS2' | ..... | MCS29' | MCS30' |

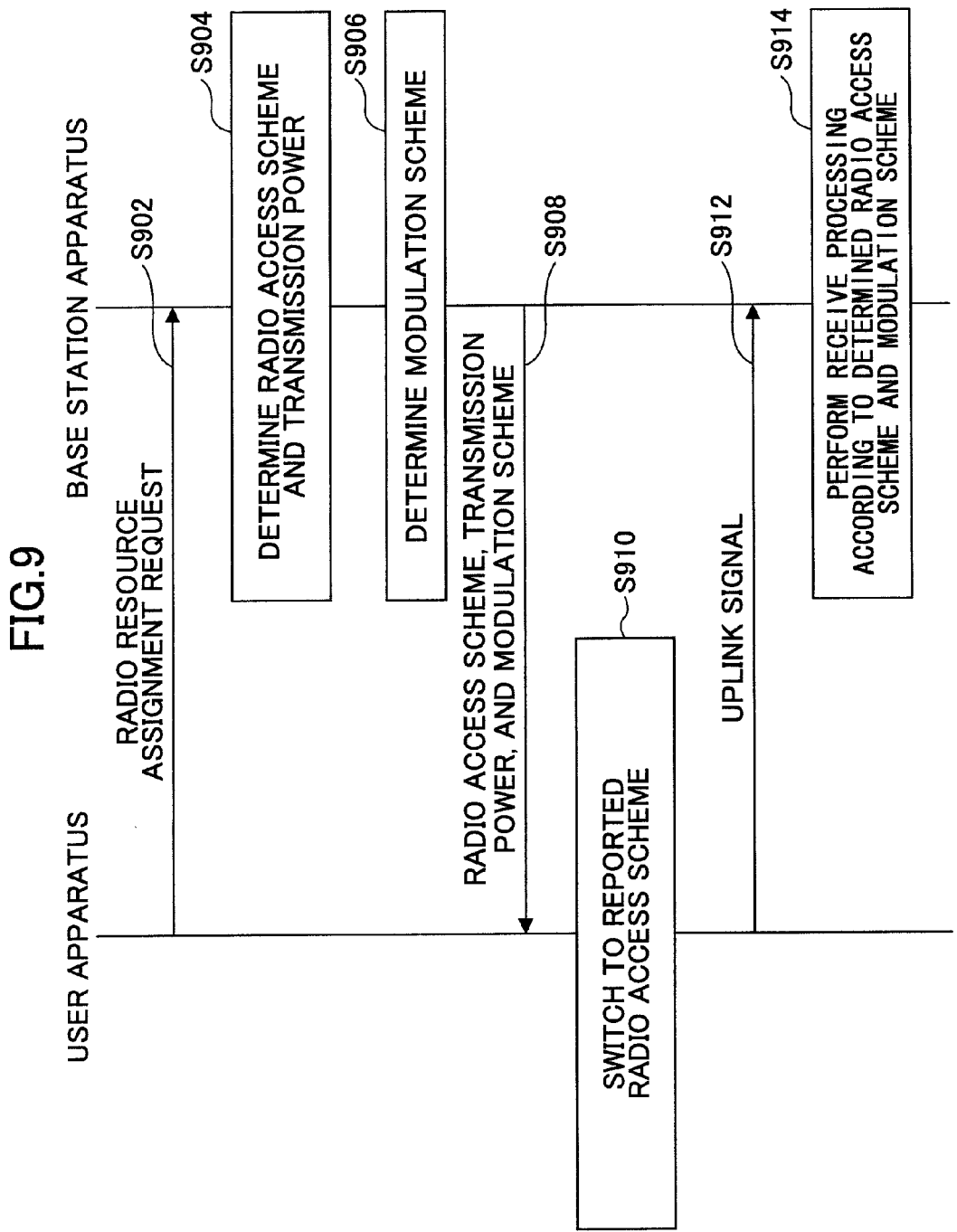

USER APPARATUS, BASE STATION APPARATUS AND COMMUNICATION CONTROL METHOD

TECHNICAL FIELD

The present invention relates to a radio communication system. More particularly, the present invention relates to a user apparatus, a base station apparatus and a communication control method.

BACKGROUND ART

A successor communication scheme to W-CDMA (Wideband Code Division Multiple Access) and HSPA (High Speed Packet Access), that is, Evolved UTRA and UTRAN (also referred to as LTE (Long Term Evolution) or Super 3G) is being discussed in W-CDMA standardization group 3GPP ($3^{rd}$ Generation Partnership Project). In the E-UTRA, for example, OFDMA (Orthogonal Frequency Division Multiple Access) and SC-FDMA (Single-Carrier Frequency Division Multiple Access) are utilized for downlink and uplink, respectively.

The OFDMA is a multicarrier transmission scheme where a frequency band is divided into multiple narrower frequency bands (subcarriers) and data is transmitted in the individual subcarriers. The OFDMA achieves fast transmission by arranging the subcarriers in the frequency band densely while partially overlapping the subcarriers without interfering with each other, resulting in higher frequency utilization efficiency. In addition, the OFDMA can remove multipath interference in multiple streams within a guard interval section. Therefore, the OFDMA has high affinity with MIMO multiplexing. In addition, link capacity can be increased by frequency scheduling. Also, in the OFDMA, since soft handover combining can be performed between cells, reception quality can be improved. Especially, the soft handover combining is applied to MBSFN (Multicast/Broadcast Single Frequency Network).

The SC-FDMA is a transmission scheme where a frequency band is divided and the different frequency bands are utilized for multiple terminals for reduction in interference among the terminals. Since the SC-FDMA has characteristics of reduced variations of transmission power, it can reduce power consumption in the terminals and realize broader coverage.

The SC-FDMA used for uplink radio access in E-UTRA is described with reference to FIG. 1. The frequency band usable in the system is divided into multiple resource blocks, each resource block including one or more subcarriers. The user apparatus (UE: User Equipment) is assigned one or more resource blocks. In the frequency scheduling, a resource block is preferentially assigned to a user apparatus in good channel state according to received signal quality or channel state information (CQI: Channel Quality Indicator) for each uplink resource block of each user apparatus measured by the base station apparatus, so that transmission efficiency or throughput of the whole system can be improved. Also, frequency hopping may be applied where usable frequency blocks are changed according to a predetermined frequency hopping pattern.

In FIG. 1, different hatching patterns indicate time/frequency resources assigned to different user apparatuses respectively. Although UE2 is assigned a wide band, it is assigned a narrow band in a next subframe. Different frequency bands are assigned to user apparatuses respectively such that the frequency bands do not overlap with each other.

In the SC-FDMA, each user apparatus in a cell performs transmission using different time/frequency resources. Accordingly, orthogonalization between user apparatuses in the cell is realized. In the SC-FDMA, by assigning continuous frequencies, single-carrier transmission of low PAPR (Peak-to-Average Power ratio) can be realized. Therefore, coverage area can be widened in the uplink where limitation for transmission power is strict. In the SC-FDMA, a scheduler of the base station apparatus determines the time/frequency resource to be assigned based on propagation state of each user, and QoS (Quality of Service) of data to be transmitted. Here, QoS includes a data rate, a required error rate, and delay. As mentioned above, by assigning time/frequency resources of good propagation state to each user, throughput can be increased.

RELATED ART DOCUMENT

Non-Patent Document

Non-patent document 1: R. Dinis et al., "A Multiple Access Scheme for the Uplink of Broadband Wireless Access," IEEE Globecom, December 2004

SUMMARY OF THE INVENTION

Problem to be Solved by the Invention

In ITU-R (International Telecommunication Union Radio communication sector), call for proposals of IMT-Advanced radio interfaces has started, and standardization works have started aiming to completing specifications in 2011.

With that, in 3GPP (3rd Generation Partnership Project), study of LTE-Advanced is starting as an advanced system of LTE Release 8 (to be referred to as Rel-8 LTE hereinafter).

In this next generation radio communication system, communication under various environments should be supported. For example, the various environments include micro cell, indoor cell, and hotspot cell.

Also, for the next generation radio communication system, it is required to provide services according various environments and required QoS and the like. The services include speed-up of data rate, support of various traffics required by QoS requirements. Also, it is required to increase the coverage area. For example, various environments include macro cell, micro cell, indoor cell, hotspot cell as shown in FIG. 2. FIG. 2 shows an indoor/hotspot layer including indoor cell/hotspot cells, a micro layer including micro cells, and a macro layer including macro cells. In the next generation radio communication system, communication under these various environments should be supported. Also, QoS includes data rate, required error rate, delay and the like. Also, the data rate may be called user throughput.

Also, reduction of network cost is required for the next generation radio communication system. For example, it is achieved by realizing large transmission capacity and wide coverage area.

Further, it is desirable that the next generation radio communication system has compatibility with a 3G (3rd Generation) system. For example, it is desirable to be able to realize full support of E-UTRA, and handover with the existing 3G systems such as W-CDMA and E-UTRA.

From the viewpoint of increasing user throughput to be greater than that of the system to which E-UTRA is applied in the above-mentioned requirements, the multicarrier scheme is preferable rather than the single-carrier scheme applied in E-UTRA in the uplink. For example, the reason is that, if single user MIMO (Multiple Input Multiple Output) is applied for realizing high speed transmission, the OFDM based multicarrier scheme that has good tolerance to multipath interference is superior.

On the other hand, from the viewpoint of realizing wide coverage area, the single-carrier scheme that can reduce PAPR is more preferable. Also, from the viewpoint of satisfying requirements of full support of E-UTRA, the single-carrier scheme is preferable.

The present invention is contrived in view of the above-mentioned problems, and an object of the present invention is to provide a user apparatus, a base station apparatus and a communication control method that can control coverage area and data rate according to environments.

Means for Solving the Problem

To solve the above-mentioned problem, the present user apparatus is a user apparatus to which radio access schemes that are a single carrier scheme and a multicarrier scheme are applied, including:

a radio access scheme setting unit configured to set a radio access scheme;

a discrete Fourier transform unit configured to perform discrete Fourier transform on a modulated symbol sequence when the radio access scheme set by the radio access scheme setting unit is the single-carrier scheme;

a serial parallel conversion unit configured to perform serial parallel conversion on a modulated symbol sequence when the radio access scheme set by the radio access scheme setting unit is the multicarrier scheme;

a frequency domain signal generation unit configured to assign a radio resource to the modulated symbol sequence on which discrete Fourier transform has been performed by the discrete Fourier transform unit or to the modulated symbol sequence on which serial parallel conversion has been performed by the serial parallel conversion unit to generate a frequency domain signal;

a transmission signal generation unit configured to perform inverse fast Fourier transform on the frequency domain signal generated by the frequency domain signal generation unit to generate a transmission signal;

a transmission power control unit configured to perform transmission power control according to the radio access scheme set by the radio access scheme setting unit; and an RF unit configured to convert the transmission signal generated by the transmission signal generation unit to a radio frequency, and to transmit the transmission signal according to the transmission power control by the transmission power control unit.

The present user apparatus is a user apparatus to which radio access schemes that are a single-carrier scheme and a multicarrier scheme are applied, including:

a radio access scheme setting unit configured to set a radio access scheme;

a data modulation unit configured to perform modulation processing on a channel-coded signal using a modulation scheme that is set according to the radio access scheme set by the radio access scheme setting unit;

a discrete Fourier transform unit configured to perform discrete Fourier transform on a symbol sequence modulated by the data modulation unit when the radio access scheme set by the radio access scheme setting unit is the single-carrier scheme;

a serial parallel conversion unit configured to perform serial parallel conversion on a symbol sequence modulated by the data modulation unit when the radio access scheme set by the radio access scheme setting unit is the multicarrier scheme;

a frequency domain signal generation unit configured to assign a radio resource to the modulated symbol sequence on which discrete Fourier transform has been performed by the discrete Fourier transform unit or to the modulated symbol sequence on which serial parallel conversion has been performed by the serial parallel conversion unit to generate a frequency domain signal;

a transmission signal generation unit configured to perform inverse fast Fourier transform on the frequency domain signal generated by the frequency domain signal generation unit to generate a transmission signal; and an RF unit configured to convert the transmission signal generated by the transmission signal generation unit to a radio frequency, and to transmit the transmission signal.

The present communication control method is a communication control method in a user apparatus to which radio access schemes that are a single-carrier scheme and a multi-carrier scheme are applied, including:

a radio access scheme setting step of setting a radio access scheme;

a discrete Fourier transform step of performing discrete Fourier transform on a modulated symbol sequence when the radio access scheme set by the radio access scheme setting step is the single-carrier scheme;

a serial parallel conversion step of performing serial parallel conversion on a modulated symbol sequence when the radio access scheme set by the radio access scheme setting step is the multicarrier scheme;

a frequency domain signal generation step of assigning a radio resource to the modulated symbol sequence on which discrete Fourier transform has been performed by the discrete Fourier transform step or to the modulated symbol sequence on which serial parallel conversion has been performed by the serial parallel conversion step to generate a frequency domain signal;

a transmission signal generation step of performing inverse fast Fourier transform on the frequency domain signal generated by the frequency domain signal generation step to generate a transmission signal;

a transmission power control step of performing transmission power control according to the radio access scheme set by the radio access scheme setting step; and a transmission step of converting the transmission signal generated by the transmission signal generation step to a radio frequency, and transmitting the transmission signal according to the transmission power control by the transmission power control step.

The present communication control method is a communication control method in a user apparatus to which radio access schemes that are a single-carrier scheme and a multi-carrier scheme are applied, including:

a radio access scheme setting step of setting a radio access scheme;

a modulation processing step of perform modulation processing on a channel-coded signal using a modulation scheme that is set according to the radio access scheme set by the radio access scheme setting step;

a discrete Fourier transform step of performing discrete Fourier transform on a symbol sequence modulated by the modulation processing step when the radio access scheme set by the radio access scheme setting step is the single-carrier scheme;

a serial parallel conversion step of performing serial parallel conversion on a symbol sequence modulated by the modulation processing step when the radio access scheme set by the radio access scheme setting step is the multicarrier scheme;

a frequency domain signal generation step of assigning a radio resource to the modulated symbol sequence on which discrete Fourier transform has been performed by the discrete Fourier transform step or to the modulated symbol sequence on which serial parallel conversion has been performed by the serial parallel conversion step to generate a frequency domain signal;

a transmission signal generation step of performing inverse fast Fourier transform on the frequency domain signal generated by the frequency domain signal generation step to generate a transmission signal; and a transmission step of converting the transmission signal generated by the transmission signal generation step to a radio frequency, and transmitting the transmission signal.

The present base station apparatus is a base station apparatus for performing communication with a user apparatus to which radio access schemes that are a single-carrier scheme and a multicarrier scheme are applied, including:

a radio access scheme setting unit configured to set a radio access scheme to be used by the user apparatus;

a transmission power setting unit configured to set transmission power of the user apparatus according to the radio access scheme set by the radio access scheme setting unit;

a reporting unit configured to report information indicating the radio access scheme set by the radio access scheme setting unit and transmission power set by the transmission power setting unit.

The present base station apparatus is a base station apparatus for performing communication with a user apparatus to which radio access schemes that are a single-carrier scheme and a multicarrier scheme are applied, including:

a radio access scheme setting unit configured to set a radio access scheme to be used by the user apparatus;

a modulation scheme setting unit configured to set a modulation scheme to be applied to the user apparatus according to the radio access scheme set by the radio access scheme setting unit; and a reporting unit configured to report information indicating the radio access scheme set by the radio access scheme setting unit and the modulation scheme set by the modulation scheme setting unit.

The present communication control method is a communication control method in a base station apparatus for performing communication with a user apparatus to which radio access schemes that are a single-carrier scheme and a multicarrier scheme are applied, including:

a radio access scheme setting step of setting a radio access scheme to be applied to the user apparatus;

a transmission power setting step of setting transmission power of the user apparatus according to the radio access scheme set by the radio access scheme setting step; and a reporting step of reporting information indicating the radio access scheme set by the radio access scheme setting step and transmission power set by the transmission power setting step.

The present communication control method is a communication control method in a base station apparatus for performing communication with a user apparatus to which radio access schemes that are a single-carrier scheme and a multi-carrier scheme are applied, including:

a radio access scheme setting step of setting a radio access scheme to be applied to the user apparatus;

a modulation scheme setting step of setting a modulation scheme to be applied to the user apparatus according to the radio access scheme set by the radio access scheme setting step; and a reporting step of reporting information indicating the radio access scheme set by the radio access scheme setting step and the modulation scheme set by the modulation scheme setting step.

Effect of the Present Invention

According to an embodiment of the present invention, a user apparatus, a base station apparatus and a communication control method that can control coverage area and data rate according to environments can be realized.

BRIEF DESCRIPTION OF THE DRAWINGS

FIG. 4 is a schematic diagram showing an example of adaptive control of the access scheme;

FIG. 8 is a schematic diagram showing a MCS table according to an embodiment; and FIG. 9 is a flow diagram showing a communication control method according to an embodiment.

EMBODIMENTS FOR CARRYING OUT THE INVENTION

Figure 1:
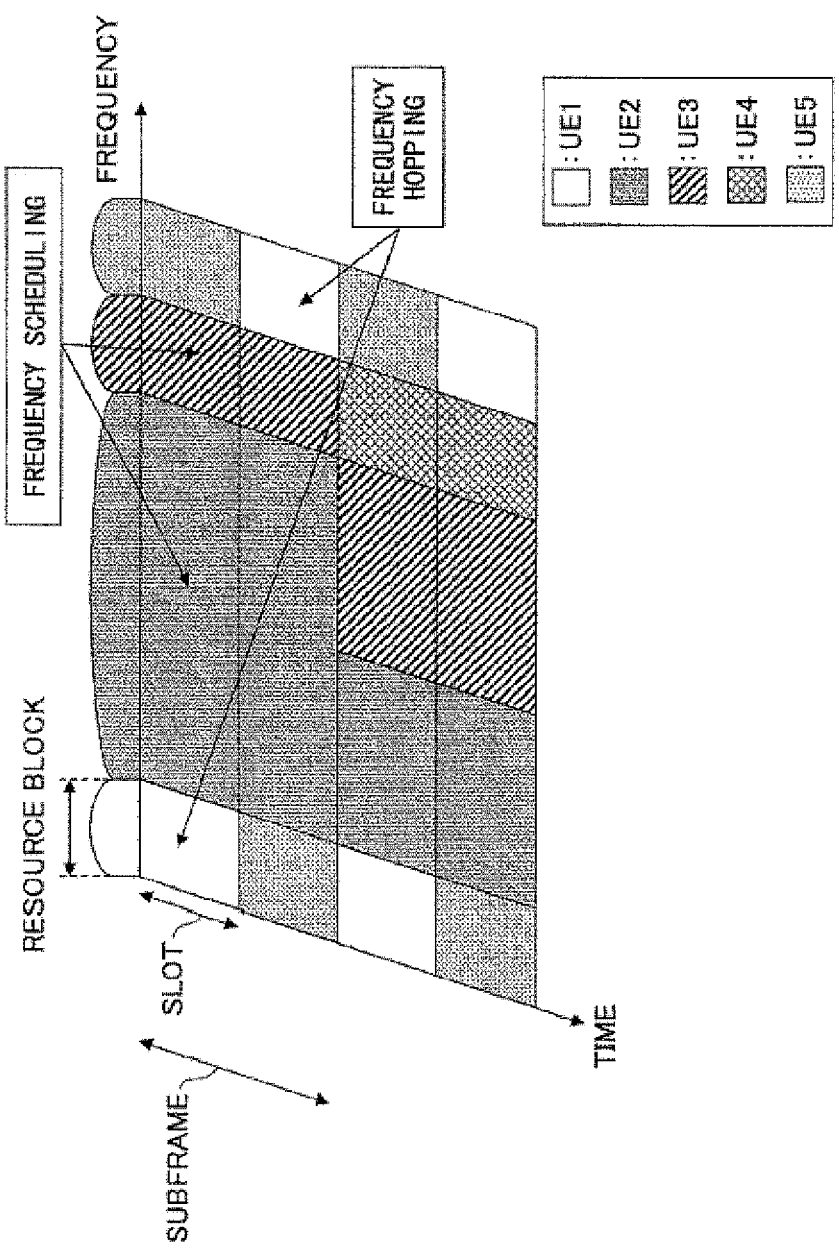
FIG. 1 is a schematic diagram showing single-carrier—FDMA.
Figure 2:
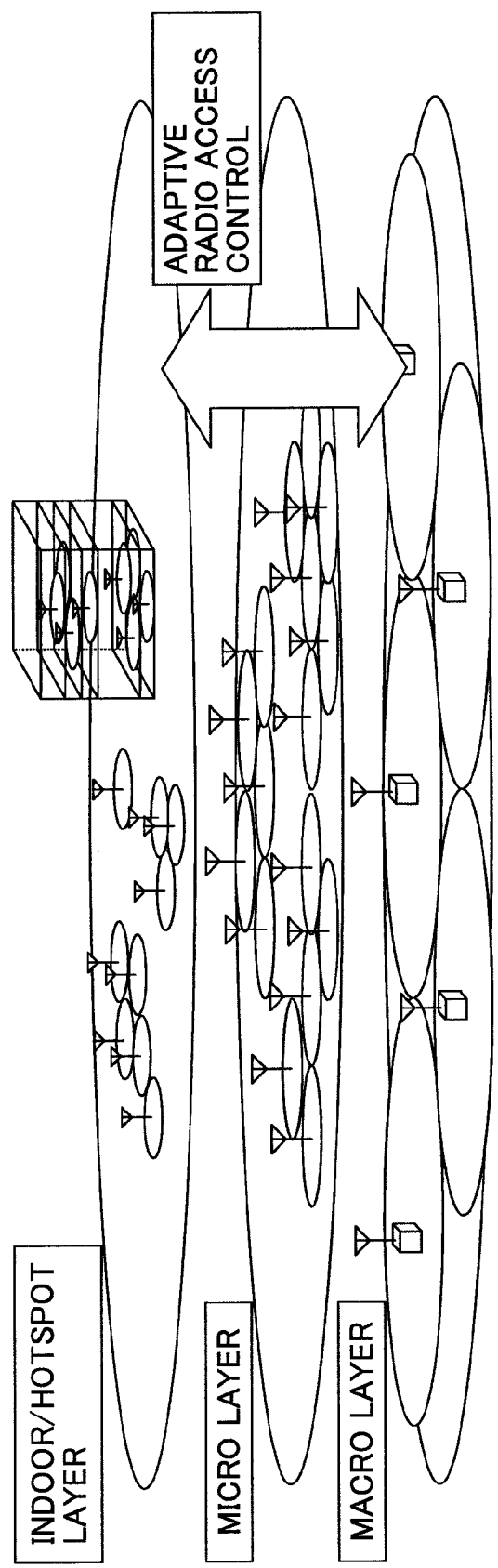
FIG. 2 is a schematic diagram showing requirements for uplink.

In the following, embodiments of the present invention are descried with reference to attached figures. In all the drawings illustrating the embodiments, the same reference symbols are attached to those having the same functions, and descriptions thereof are not repeated.

In the LTE-Advanced, it is the minimum requirements to satisfy requirements defined in IMT-Advanced, and the radio access scheme needs to be studied by considering the following items mainly.

(1) Support of transmit and receive of wide-band signal transmission;

(2) Backward compatibility with Rel-8 LTE (3) Optimization of trade-off between improvement of characteristics and overhead of control signal;

(4) Support of various cell environments;

As to (1), in order to satisfy the requirement of peak data rate of equal to or more than 1 Gbps in the downlink especially and the requirement of peak data rate of equal to or more than 500 Mbps in the uplink, it is necessary to extend 20 MHz that is the maximum system bandwidth of the Rel-8 LTE specification to support about 100 MHz of frequency bandwidth in the transmit and receive function. In addition, it is necessary to support scalable multi-bandwidths having high flexibility for frequency spectrum assignment.

As to (2), in the LTE-Advanced, it is the minimum requirement to satisfy the requirements of IMT-Advanced. In addition, backward compatibility with Rel-8 LTE is essential in order to be able to introduce the system smoothly. That is, it is essential to provide a radio interface that can support connection of a user terminal (UE: User Equipment) of Rel-8 LTE within the frequency spectrum of LTE-Advanced.

As to (3), improvement factor of frequency diversity gain and frequency scheduling gain reduces (becomes saturated) as the frequency band becomes wider. On the other hand, overhead of control signals necessary for feedback of channel quality information (CQI: Channel Quality Indicator) increases as the bandwidth increases. Therefore, it is necessary to set optimal transmit and receive bandwidth in consideration of trade-off relationship between improvement of characteristics and overhead of control signals.

As to (4), considering complementary introduction with the Rel-8 LTE, the LTE-Advanced emphasizes application to local area environments such as micro cell, indoor/hotspot environment and the like. But, it is also necessary to realize support of the outdoor macro-cell environment like the Rel-8 LTE. For example, in the case when the system is mainly applied to a local environment such as indoor environment, OFDMA is preferable since the problem of coverage becomes small.

In addition, considering application of the MIMO multiplexing transmission (Single User-MIMO) in order to further increase peak data rate, it is effective, especially for the local area environment, to apply OFDM (Orthogonal Frequency Division Multiplexing) having a high affinity with the accurate signal separation technique such as MLD (Maximum Likelihood Detection). In this point, LTE-Advanced is different from the Rel-8 LTE that emphasizes increase of coverage due to reduction of PAPR.

(System)

Figure 3:
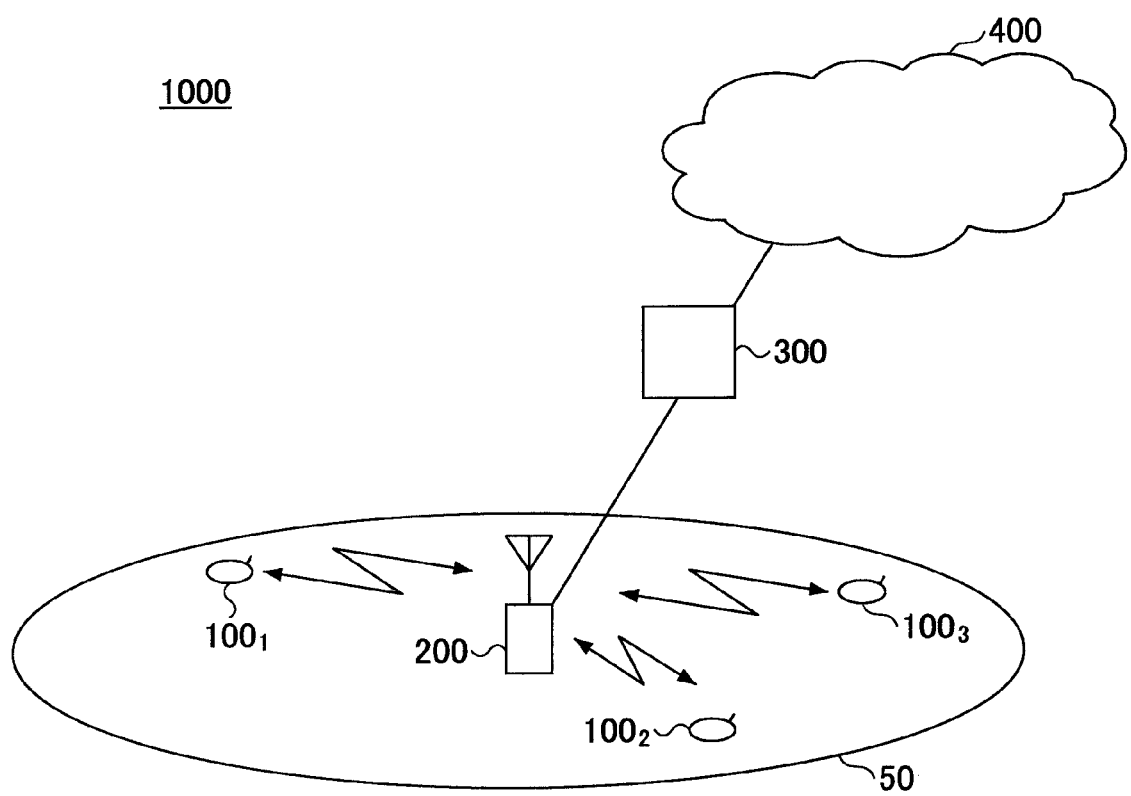
FIG. 3 is a schematic diagram showing a radio communication system according to an embodiment.

In the following, the radio communication system including the user apparatus and the base station apparatus of an embodiment of the present invention is described with reference to FIG. 3.

The radio communication system 1000 is a system including, for example, Evolved UTRA and UTRAN (also called Long Term Evolution or Super 3G). The radio communication system may be also called as IMT-Advanced or 4G.

The radio communication system 1000 includes a base station apparatus (eNB: eNode B) 200 and user apparatuses (UE: User Equipment) $100_n$ ($100_1$, $100_2$, $100_3$, ..., $100_n$; where n is an integer greater than 0) that communicates with the base station apparatus 200. The names of eNB and UE may be changed according to discussions for the communication schemes of the next-generation radio communication systems. In such a case, these may be called as the changed names. The base station apparatus 200 is connected to an upper station 300, and the upper station 300 is connected to a core network 400. For example, the upper station 300 may include an access gateway apparatus. The access gateway apparatus may be called MME/SGW (Mobility Management Entity/Serving Gateway). Also, the upper station may be changed as necessary according to discussions of the communication schemes of the next generation radio communication system.

Since each user apparatus ($100_1$, $100_2$, $100_3$ ... $100_n$) has the same configuration, function and state, the user apparatus $100_n$ is used in the descriptions below unless otherwise mentioned. For the sake of convenience of explanation, although a mobile station apparatus communicates with the base station apparatus 200 by radio, it is described as a user apparatus (UE: User Equipment) including a mobile terminal and a fixed terminal in the more general sense.

The radio communication system 1000, in Evolved UTRA, for example, employs orthogonal frequency division multiple access (OFDMA) in the downlink, and employs single-carrier frequency division multiple access (SC-FDMA) in the uplink. As mentioned above, OFDMA is a multicarrier communication scheme in which a frequency band is divided into narrow frequency bands (subcarriers) and data is mapped to each subcarrier for performing communication. SC-FDMA is a single-carrier transmission scheme in which a frequency band is divided for each user apparatus, and a plurality of user apparatuses use frequency bands different with each other in order to reduce interference between the user apparatuses. Since the downlink includes OFDMA, and the uplink includes SC-FDMA, this radio communication system can realize full support of E-UTRA.

In the following, communication channels used in Evolved UTRA and UTRAN are described. These communication channels may be applied to the radio communication system of the present embodiment.

For downlink, a physical downlink shared channel (PDSCH) shared by the user apparatuses $100_n$ and a physical downlink control channel (PDCCH) are used. The physical downlink control channel is also called as a downlink L1/L2 control channel. User data, that is, a normal data signal is transmitted by the physical downlink shared channel.

For uplink, a physical uplink shared channel (PUSCH) shared by the user apparatuses $100_n$ and a physical uplink control channel (PUCCH) are used. User data, that is, a normal data signal is transmitted by the physical uplink shared channel. Also, the physical uplink control channel is used to transmit downlink quality information (channel quality indicator: CQI) used for scheduling and adaptive modulation and coding (AMC) of the physical downlink shared channel and to transmit acknowledgement information for the physical downlink shared channel. The acknowledgement information is represented by any one of Acknowledgement (ACK) indicating that a transmission signal is properly received and Negative Acknowledgement (NACK) indicating that the signal is not properly received.

The physical uplink control channel may also be used to transmit, in addition to the CQI and the acknowledgement information, a scheduling request for requesting assignment of resources of an uplink shared channel and a release request used in persistent scheduling. Here, assignment of resources of an uplink shared channel indicates a process where the base station apparatus 200 reports to the user apparatus $100_n$ by using the physical downlink control channel in a given subframe that the user apparatus is allowed to communicate using the uplink shared channel in a subsequent subframe.

In the radio communication system of the present embodiment, multiple radio access schemes are applied to the user apparatus $100_n$. For example, the radio access schemes include a single-carrier scheme and a multicarrier scheme. In this case, the user apparatus $100_n$ can perform data transmission by the single-carrier scheme or the multicarrier scheme. Radio access schemes of the single-carrier scheme may include DFT-Spread OFDM. Also, radio access schemes of the multicarrier scheme may include OFDMA.

As shown in FIG. 4, the single-carrier scheme has low PAPR characteristics. Therefore, it is suitable for applying to the wide coverage area environment. On the other hand, the multicarrier scheme is advantageous in application to MIMO. Thus, it is suitable for applying to environment where high data rate is required. In addition, the multicarrier scheme excels in tolerance to multipath interference.

Also, the user apparatus $100_n$ may control a roll-off rate. The roll-off rate is a value indicating characteristics of the waveform shaping filter, which means degree of waveform shaping. The larger the roll-off rate is, by the larger degree PAPR can be reduced. However, the number of subcarriers that can be used for data transmission decreases due to waveform shaping. Thus, frequency use efficiency reduces, and peal data rate (maximum transmission speed) decreases. Therefore, there is a trade-off relationship between reduction of PAPR and increase of frequency use efficiency. In the present embodiment, a case where the roll-off rate is used is described for controlling PAPR and the frequency use efficiency. Accordingly, coverage area and the data rate can be controlled.

Meanwhile, the PAPR values are largely different between DFT-Spread OFDMA of the single-carrier transmission scheme and OFDMA of the multicarrier transmission scheme. Therefore, it is necessary to optimize the RF transmitter (RF circuit) according to each access scheme. More specifically, it is necessary to perform input/output level adjustments for a D/A converter and/or transmission amplifier included in the RF transmitter.

(User Apparatus (1))

In the user apparatus $100_n$ of the present embodiment, the radio access scheme is adaptively controlled according to the environment supported by the base station apparatus 200 that covers the area where the user apparatus $100_n$ resides. Also, the user apparatus $100_n$ of the present embodiment may adaptively control the roll-off rate according to the environment supported by the base station apparatus 200 that covers the area where the user apparatus $100_n$ resides. By adaptively controlling the roll-off rate according to the environment supported by the base station apparatus 200, the coverage area and the peak data rate can be optimally controlled. For example, as described later, the roll-off rate may be controlled based on bandwidth of assigned resource blocks, channel coding rate, and modulation scheme.

Figure 5:
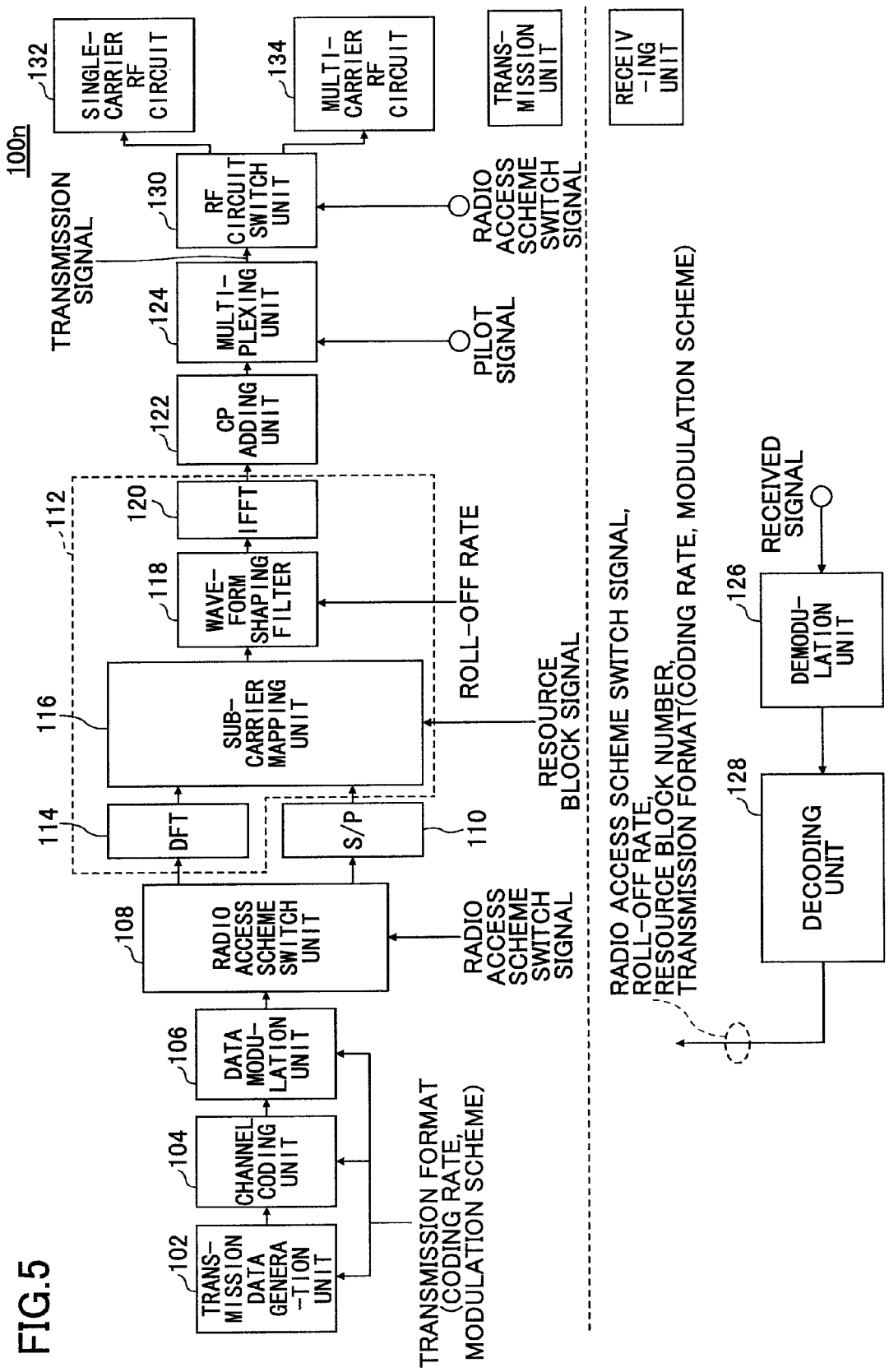
FIG. 5 is a functional block diagram showing a user apparatus according to an embodiment.

The user apparatus $100_n$ of the present embodiment is described with reference to FIG. 5.

The user apparatus $100_n$ of the present embodiment includes a transmission data generation unit 102, a channel coding unit 104, a data modulation unit 106, a radio access scheme switch unit 108, a serial parallel conversion unit (S/P) 110, a DFT-Spread OFDM processing unit 112, a CP (cyclic Prefix) adding unit 122, a multiplexing unit 124, a demodulation unit 126, a decoding unit 128, a RF circuit switch unit 130, a single-carrier RF circuit 132 and a multicarrier RF circuit 134. Also, the DFT-Spread OFDM processing unit 112 includes a discrete Fourier transform unit 114, a subcarrier mapping unit 116, a waveform shaping filter 118 and an inverse fast Fourier transform unit (IFFT) 120.

A downlink signal transmitted by the base station apparatus 200 is supplied to the demodulation unit 126. The demodulation unit 126 demodulates the supplied OFDMA signal. Then, the demodulation unit 126 supplies the demodulated OFDMA signal to the decoding unit 128. The decoding unit 128 decodes the OFDMA signal input by the demodulation unit 126. The OFDMA signal may be a signal to be transmitted by a broadcast channel or a signal transmitted by the downlink control channel. The OFDMA signal may include a radio access scheme switch signal, a roll-off rate, a resource block number, and a transmission format. The transmission format may include a coding rate and a modulation scheme. The decoding unit 128 supplies the transmission format to the transmission data generation unit 102, the channel coding unit 104 and the data modulation unit 106. In addition, the decoding unit 128 supplies the radio access scheme switch signal to the radio access scheme switch unit 108 and the RD circuit switch unit 130. Also, the decoding unit 128 supplies the resource block number to the subcarrier mapping unit 116. Also, the decoding unit 128 supplies the roll-off rate to the waveform shaping filter 118.

The transmission data generation unit 102 generates data transmitted by the uplink. The transmission data generation unit 102 supplies the generated data to be transmitted by the uplink to the channel coding unit 104.

The channel coding unit 104 performs channel coding processing on the transmission data supplied from the transmission data generation unit 102 based on the transmission format supplied from the decoding unit 128. The channel coding unit 104 supplies the transmission data on which channel coding processing has been performed to the data modulation unit 106. For example, the channel coding unit 104 performs channel coding processing using the coding rate included in the transmission format.

The data modulation unit 106 modulates the transmission data, supplied from the channel coding unit 104, on which channel coding processing has been performed based on the transmission format supplied by the decoding unit 128. The data modulation unit 106 supplies the modulated transmission data on which channel coding processing has been performed to the radio access scheme switch unit 108. For example, the data modulation unit 106 performs data modulation using the modulation scheme included in the transmission format.

The radio access scheme switch unit 108 switches (sets) a mode into a single-carrier mode for transmitting the transmission data by the single-carrier scheme or into a multicarrier mode for transmitting the transmission data by the multicarrier scheme, based on the radio access scheme switch signal supplied by the decoding unit 128, the transmission data being modulated and supplied from the data modulation unit 106, and wherein channel coding processing has been performed on the transmission data. When the radio access scheme switch signal includes information indicating the single-carrier scheme, the radio access scheme switch unit 108 supplies the modulated transmission data to the discrete Fourier transform unit 114. Also, when the radio access scheme switch signal includes information indicating the multicarrier scheme, the radio access scheme switch unit 108 supplies the modulated transmission data on which channel coding processing has been performed to the serial parallel conversion unit (S/P) 110.

The discrete Fourier transform unit 114 divides sequences of the supplied transmission data into blocks every Q symbols so as to perform fast Fourier transform to transform the data into the frequency domain. Then, the discrete Fourier transform unit 114 supplies the Q signals of single-carrier obtained in the frequency domain to the subcarrier mapping unit 116.

The serial parallel conversion unit (S/P) 110 converts the sequence of the supplied transmission data to multiple parallel signal sequences. Then, the serial parallel conversion unit 110 supplies the multiple parallel signal sequences to the subcarrier mapping unit 116.

The subcarrier mapping unit 116 assigns the single-carrier signal supplied by the discrete Fourier transform unit 114 or the signals supplied by the serial parallel conversion unit 110 to each subcarrier based on the resource block number supplied from the decoding unit 128 so as to generate a signal in the frequency domain, the signals supplied by the serial parallel conversion unit 110 being converted to multiple parallel signal sequences. For example, the subcarrier mapping unit 116 assigns a single-carrier signal to subcarriers corresponding to the resource block number. Also, for example, the subcarrier mapping unit 116 assigns each of signals being converted to multiple parallel signal sequences to subcarriers corresponding to the resource block number. For example, the assigned subcarriers may be discrete subcarriers or may be consecutive subcarriers. The subcarrier mapping unit 116 supplies the signal mapped to subcarriers to the waveform shaping filter 118.

The waveform shaping filter 118 performs waveform shaping for the supplied signal based on the roll-off rate supplied from the decoding unit 128. Then, the waveform-shaped signal is supplied to the IFFT 120.

The IFFT 120 performs inverse fast Fourier transform on the supplied signal to perform modulation of the OFDM scheme. The signal modulated by the OFDM scheme is supplied to the CP adding unit 122.

The CP adding unit 122 adds a cyclic prefix to the signal modulated by the OFDM scheme to generate symbols of the OFDM scheme. The CP adding unit 122 supplies the generated symbols of the OFDM scheme to the multiplexing unit 124.

The multiplexing unit 124 multiplexes the symbols of the OFDM scheme and a pilot signal. The multiplexed signal is supplied to the RF circuit switch unit 130.

The RF circuit switch unit 130 switches the transmission data supplied from the multiplexing unit 124 so as to supply the transmission data to the single-carrier RF circuit 132 or to the multicarrier RF circuit 134 based on the radio access scheme switch signal supplied from the decoding unit 128, the symbols of the OFDM scheme and the pilot signal being multiplexed in the transmission data. The single-carrier RF circuit 132 converts the transmission data to be transmitted by the single-carrier scheme to a radio frequency. The multicarrier RF circuit 134 converts the transmission data to be transmitted by the multicarrier scheme to a radio frequency.

Input/output level adjustments have been performed for the single-carrier RF circuit 132 based on PAPR determined by the single-carrier scheme. In other words, input/output level adjustments have been performed for the single-carrier RF circuit 132 based on PAPR that is estimated when the signal is transmitted by the single-carrier scheme. The single-carrier RF circuit 132 performs D/A conversion on the transmission data supplied by the RF circuit switch unit 130 in which the symbols of the OFDM scheme and the pilot signal are multiplexed, and the single-carrier RF circuit 132 converts the transmission data on which D/A conversion has been performed to a radio frequency, and performs transmission power control to transmit the data.

Input/output level adjustments have been performed for the multicarrier RF circuit 134 based on PAPR determined by the multicarrier scheme. In other words, input/output level adjustments have been performed for the multicarrier RF circuit 134 based on PAPR that is estimated when the signal is transmitted by the multicarrier scheme. The multicarrier RF circuit 134 performs D/A conversion on the transmission data supplied by the RF circuit switch unit 130 in which the symbols of the OFDM scheme and the pilot signal are multiplexed, and the multicarrier RF circuit 134 converts the transmission data on which D/A conversion has been performed to a radio frequency, and performs transmission power control to transmit the data.

Accordingly, the uplink signal can be transmitted by the RF circuit that is level-adjusted according to each radio access scheme.

However, it becomes necessary to perform level adjustments for the single-carrier RF circuit 132 and the multicarrier RF circuit 134. Therefore, compared to a user apparatus to which one radio access scheme is applied so far, adjustments for twice as much as analog circuits are necessary, which is not preferable.

Thus, the single-carrier RF circuit 132 and the multicarrier RF circuit 134 may be configured to be a common circuit. In this case, transmission power may be controlled based on PAPR determined according to the radio access scheme.

(User Apparatus (2))

Figure 6:
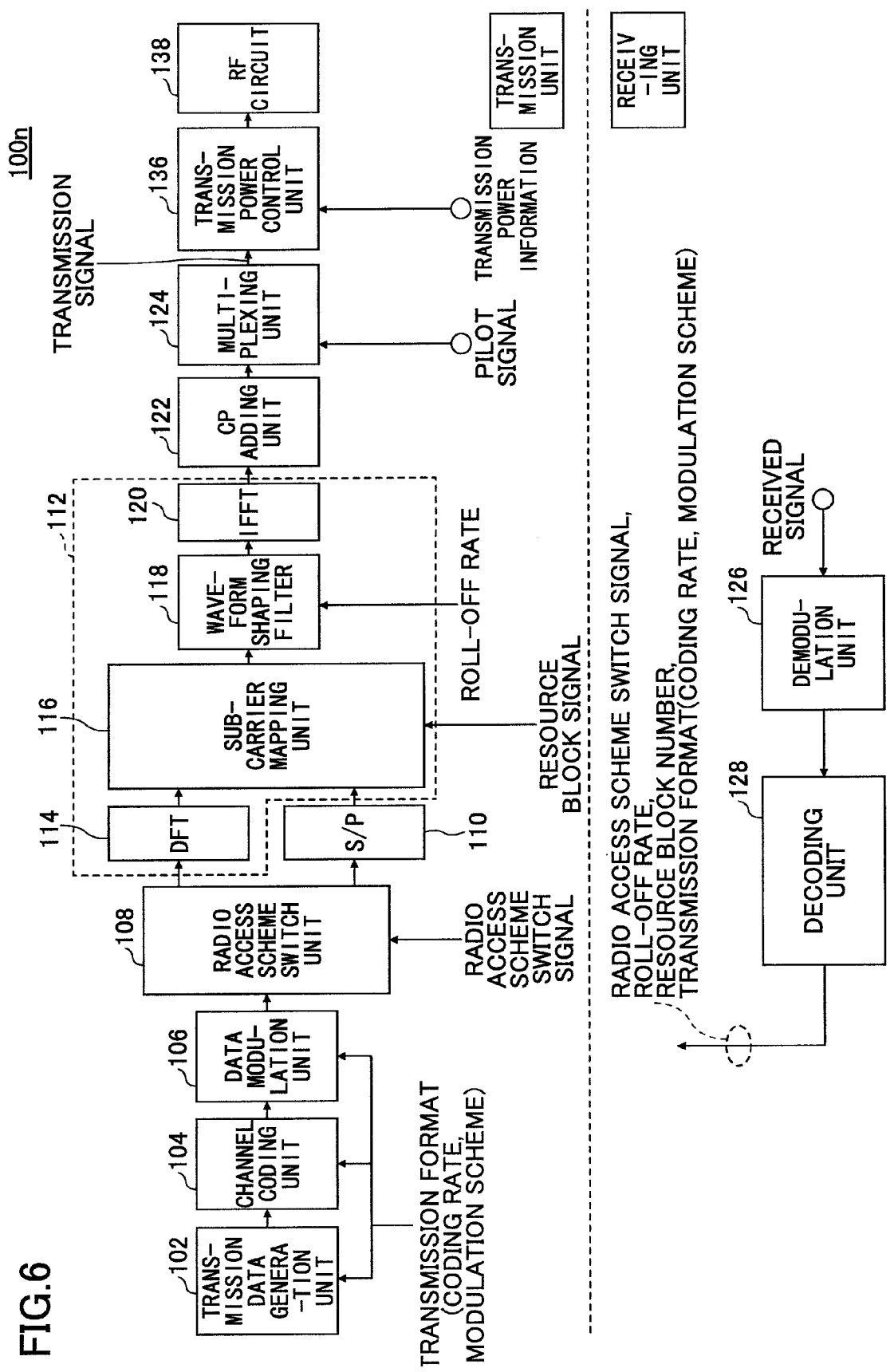
FIG. 6 is a functional block diagram showing a user apparatus according to an embodiment.

Another user apparatus $100_n$ of the present embodiment is described with reference to FIG. 6.

The user apparatus $100_n$ of the present embodiment includes a transmission power control unit 136 and a RF circuit 138 instead of the RF circuit switch unit 130, the single-carrier RF circuit 132 and the multicarrier RF circuit 134 in the user apparatus described with reference to FIG. 5.

The transmission power control unit 136 performs transmission power control based on transmission power information reported from the after-mentioned base station apparatus 200. For example, the transmission power may be determined, in the base station apparatus 200, based on PAPR that is determined in the radio access scheme. Also, the transmission power may be determined, in the base station apparatus 200, based on PAPR that is determined according to the modulation scheme. In addition, the transmission power may be determined based on PAPR that is determined according to a radio resource assigned by scheduling. The radio resource may be the number of assigned subcarriers, or may be a resource block size. The radio access scheme, the modulation scheme and the radio resource may be appropriately combined so that PAPR is determined, and the transmission power may be determined based on the determined PAPR.

The RF circuit 138 performs D/A conversion on the transmission data supplied by the transmission power control unit 136 in which the symbols of the OFDM scheme and the pilot signal are multiplexed, and the RF circuit 138 converts the transmission data on which D/A conversion has been performed to a radio frequency, and transmits the data according to control by the transmission power control unit 136.

Also, the transmission format supplied to the channel coding unit 104 and the data modulation unit 106 may be determined based on PAPR determined in the radio access scheme by the base station apparatus 200. For example, at least one of the coding rate and the modulation scheme included in the transmission format may be determined based on PAPR that is determined in the radio access scheme.

(Base Station Apparatus)

Figure 7:
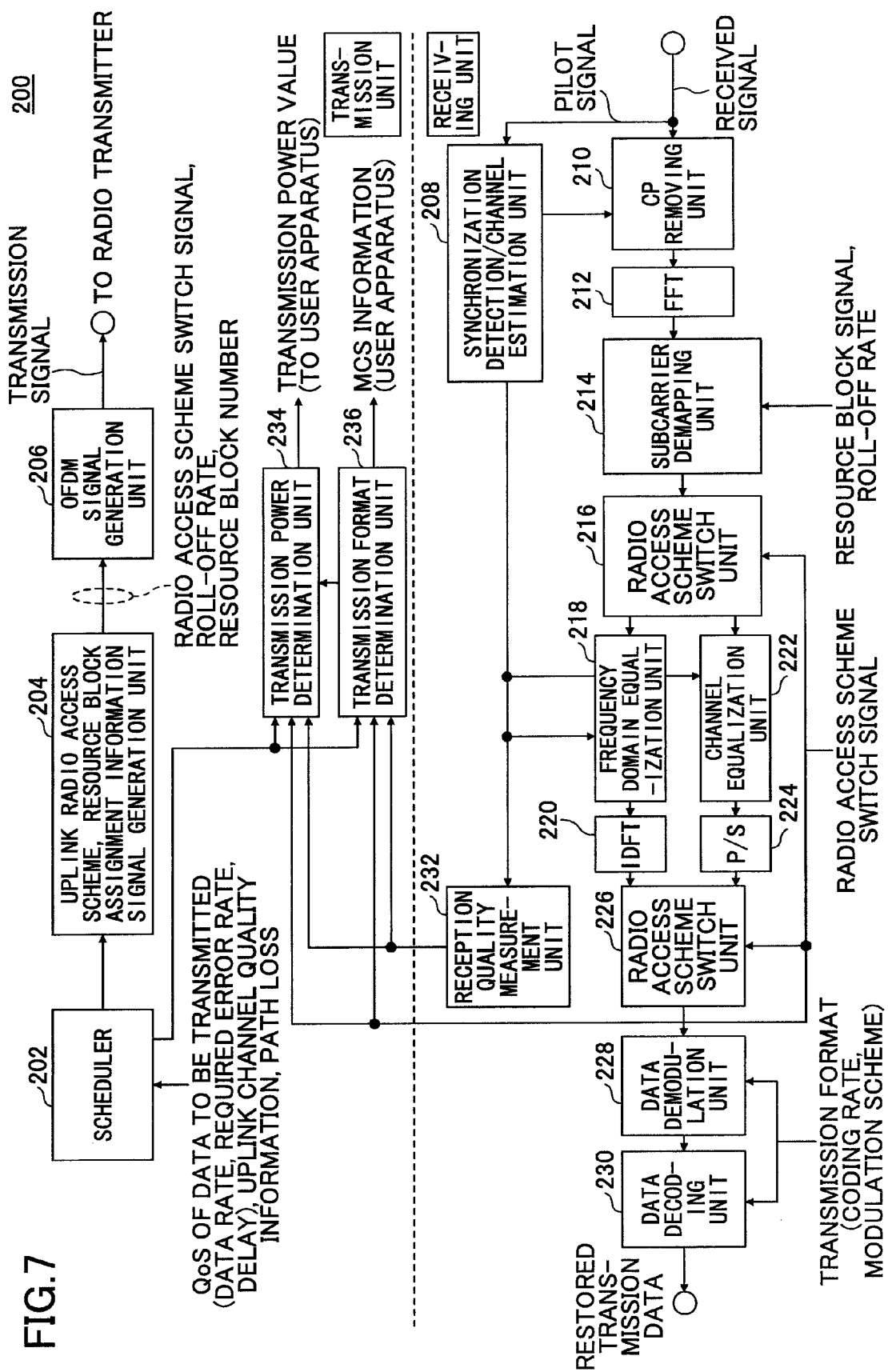
FIG. 7 is a functional block diagram showing a base station apparatus according to an embodiment.

Next, the base station apparatus 200 of the present embodiment is described with reference to FIG. 7.

The base station apparatus 200 of the present embodiment includes a scheduler 202, an uplink radio access scheme/resource block assignment information signal generation unit 204, an OFDM signal generation unit 206, a synchronization detection/channel estimation unit 208, a CP removing unit 210, a fast Fourier transform (FFT) unit 212, a subcarrier demapping unit 214, a radio access scheme switch unit 216, a frequency domain equalization unit 218, an inverse discrete Fourier transform unit (IDFT) 220, a channel equalization unit 222, a parallel serial conversion unit (P/S) 224, a radio access scheme switch unit 226, a data demodulation unit 228, a data decoding unit 230, a reception quality measurement unit 232, a transmission power determination unit 234, and a transmission format determination unit 236.

When data to be transmitted in the uplink occurs, the user apparatus $100_n$ transmits a request signal for assignment of a radio resource to be used for transmitting the data to the base station apparatus 200. The request signal may be a scheduling request. For example, the request signal may include QoS required for the data to be transmitted. For example, QoS may include a data rate. Also, the QoS may include required error rate. In addition, the QoS may include information required for delay. The QoS included in the request signal for assignment of the radio resource transmitted by the user apparatus $100_n$ is supplied to the scheduler 202.

On the other hand, the base station apparatus 200 measures reception quality based on the pilot signal transmitted by the user apparatus $100_n$. The channel quality information of the uplink is supplied to the scheduler 202. Also, the base station apparatus 200 measures path loss. The path loss is supplied to the scheduler 202.

The scheduler 202 determines a user apparatus for assigning a radio resource and determines a resource block to be assigned to the user apparatus based on the supplied QoS, uplink channel reception quality and path loss. The scheduler 202 determines a radio access scheme used by the user apparatus to which the radio resource is assigned. For example, the scheduler 202 determines whether to cause the user apparatus to which the radio resource is assigned to transmit an uplink signal using the single-carrier scheme or the multicarrier scheme.

(Radio Access Scheme Determination Method (1))

For example, the scheduler 202 may determine whether to cause the residing user apparatus $100_n$ to transmit uplink data using the single-carrier scheme or the multicarrier scheme based on an inter-site distance of the base station apparatus 200. In other words, the scheduler 202 determines the radio access scheme that the residing user apparatus $100_n$ uses based on a distance between the base station apparatus and other base station apparatus located near the base station apparatus. More particularly, when the inter-site distance is less than a predetermined distance, the scheduler 202 determines to cause the user apparatus $100_n$ to transmit the uplink data using the multicarrier scheme. By determining to cause the user apparatus $100_n$ to transmit the uplink data using the multicarrier scheme when the inter-site distance is less than a predetermined distance, peak data rate can be improved. When the inter-site distance is equal to or greater than the predetermined distance, the scheduler 202 determines to cause the user apparatus $100_n$ to transmit the uplink data using the single-carrier scheme. By determining to cause the user apparatus $100_n$ to transmit the uplink data using the single-carrier scheme when the inter-site distance is equal to or greater than a predetermined distance, coverage can be kept. The predetermined distance may be determined based on PAPR and data rate.

(Radio Access Scheme Determination Method (2))

In addition, for example, the scheduler 202 may determine whether to cause the residing user apparatus $100_n$ to transmit uplink data using the single-carrier scheme or the multicarrier scheme based on cell configuration of the base station apparatus 200. That is, the radio access scheme is determined for each base station apparatus 200. More particularly, when the cell configuration is an indoor cell or a hotspot cell, the scheduler 202 determines to cause the user apparatus $100_n$ to transmit the uplink data using the multicarrier scheme. The reason is that, since the cell radius is small, peak data rate is prioritized over the coverage area. Also, when the cell configuration is a macro-cell or a micro-cell, the scheduler 202 determines to cause the user apparatus $100_n$ to transmit the uplink data using the single-carrier scheme. The reason is that it is necessary to keep the coverage area compared to the indoor-cell or hotspot cell.

(Radio Access Scheme Determination Method (3))

In addition, for example, the scheduler 202 may determine whether to cause the residing user apparatus $100_n$ to transmit the uplink signal using the single-carrier scheme or the multicarrier scheme based on kinds of the physical channel. More particularly, the scheduler 202 determines to cause the user apparatus $100_n$ to transmit a data channel using the multicarrier scheme. Accordingly, high speed transmission can be realized. Also, the scheduler 202 determines to cause the user apparatus $100_n$ to transmit a control channel using the single-carrier scheme. Accordingly, the base station apparatus 200 can reduce reception errors of the control channel transmitted by the user apparatus $100_n$.

(Radio Access Scheme Determination Method (4))

In addition, for example, the scheduler 202 may determine whether to cause the user apparatus $100_n$ to transmit the uplink signal using the single-carrier scheme or the multicarrier scheme based on the transmission power determined for the user apparatus $100_n$. More specifically, the base station apparatus 200 obtains an average of SINR (Signal-to-Interference Plus Noise Power Ratio) based on the CQI fed back from the user apparatus $100_n$. Then, the base station apparatus 200 determines the transmission power of the user apparatus $100_n$ based on the average and the target SINR. The base station apparatus 200 determines whether to cause the user apparatus $100_n$ to perform transmission using the single-carrier scheme or the multicarrier scheme based on the determined transmission power and the maximum transmission power of the user apparatus $100_n$.

The scheduler 202 may determine, for a user to which the radio resource is assigned, a roll-off rate to be applied to the user apparatus. The roll-off rate may be one value or may be a plurality of values. For example, the scheduler 202 may determine different roll-off rates based on locations of the residing user apparatus.

When the scheduler 202 determines to cause the user apparatus $100_n$ to perform transmission using the multicarrier scheme, the scheduler 202 may determine the roll-off rate to be zero. By determining the roll-off rate to be zero when determining to cause the use apparatus to perform transmission using the multicarrier scheme, high speed transmission can be realized. On the other hand, when the scheduler 202 determines to cause the user apparatus $100_n$ to perform transmission using the single-carrier scheme, the scheduler 202 may determine the roll-off rate according to the radius of the cell covered by the base station apparatus 200. For example, the larger the cell radius is, the larger roll-off rate may be set. By setting the roll-off rate in this way, PAPR can be reduced so that coverage area can be widened. Since the coverage area can be widened, it becomes possible to improve reception quality of the uplink signal transmitted from user apparatuses located at a cell edge.

The scheduler 202 supplies the determined radio access scheme, the roll-off rate, and the resource block assigned to the use to the uplink radio access scheme/resource block assignment information signal generation unit 204. Also, the scheduler 202 supplies the determined radio access scheme to the transmission power determination unit 234 and the transmission format determination unit 236. When the radio access scheme is determined based on the transmission power, the scheduler 202 may supply the determined radio access scheme to the transmission format determination unit 236.

Based on the supplied radio access scheme, the transmission power determination unit 234 determines the transmission power based on PAPR that is determined according to the radio access scheme, based on the supplied radio access scheme. For example, a correspondence table may be prepared beforehand in which transmission power and estimated PAPR are associated with each other for each radio access scheme. Then, the transmission power determination unit 234 may determine the transmission power such that the estimated PAPR becomes equal to or less than a predetermined value. For example, the transmission power is determined such that a value obtained by adding PAPR to the transmission power does not exceed the maximum transmission power of the user apparatus $100_n$.

The transmission power determination unit 234 reports information of the determined transmission power to the user apparatus $100_n$. For example, it may be reported by the physical downlink control channel. The physical downlink control channel may include a L1/L2 control channel.

The transmission format determination unit 236 determines a transmission format based on PAPR that is determined according to the radio access scheme based on the supplied radio access scheme. For example, the transmission format determination unit 236 determines a coding rate and/or a modulation scheme included in the transmission format. A corresponding table may be prepared beforehand in which the transmission format and the estimated PAPR are associated with each other for each radio access scheme. Then, the transmission format determination unit 236 determines the transmission format such that the estimated PAPR becomes equal to or less than a predetermined value.

A MCS selection table may be prepared for each radio access scheme. In this case, the transmission format may be determined based on instantaneous SINR. The transmission format determination unit 236 reports the determined transmission format to the user apparatus $100_n$. The transmission format may be called MCS (Modulation and channel Coding scheme) information. For example, it may be reported by the physical downlink control channel. The physical downlink control channel may include a L1/L2 control channel.

The scheduler 202 supplies information indicating a resource block to be assigned to the user to the subcarrier demapping unit 214. For example, the information indicating the resource block may include a resource block number. The radio access scheme switch signal including the determined radio access scheme is supplied to the radio access scheme switch units 216 and 226. In addition, the scheduler 202 may supply the roll-off rate to the subcarrier demapping unit 214. Also, the transmission format determination unit 236 supplies a MCS set to the data demodulation unit 228 and the data decoding unit 230.

The uplink radio access scheme/resource block assignment information signal generation unit 204 generates an information signal including a radio access scheme switch signal, roll-off rate, resource block number based on the information supplied from the scheduler 202. Then, the uplink radio access scheme/resource block assignment information signal generation unit 204 supplies the generated information signal to the OFDM signal generation unit 206.

The OFDM signal generation unit 206 generates an OFDM signal from the supplied information signal and supplies the OFDM signal to the radio transmitter. The radio transmitter transmits the OFDM signal. For example, it may be reported by the physical downlink control channel. The physical downlink control channel may include the L1/L2 control channel.

The uplink signal transmitted by the user apparatus $100_n$ is received by the base station apparatus 200. The base station apparatus 200 supplies the pilot signal included in the uplink signal to the synchronization detection/channel estimation unit 208.

The synchronization detection/channel estimation unit 208 performs synchronization detection of the supplied pilot signal, estimates reception timing, and supplies the estimated reception timing to the CP removing unit 210. In addition, the synchronization detection/channel estimation unit 208 performs channel estimation based on the supplied pilot signal, and supplies the result to the frequency domain equalization unit 218 and the channel equalization unit 222. In addition, the synchronization detection/channel estimation unit 208 supplies the supplied pilot signal to the reception quality measurement unit 232. The reception quality measurement unit 232 measures uplink channel quality based on the supplied pilot signal. Then, the reception quality measurement unit 232 supplies the measured uplink channel quality information to the scheduler 202, transmission power determination unit 234 and the transmission format determination unit 236.

The CP removing unit 210 removes CP from the received signal based on the supplied reception timing. Then, the received signal from which CP is removed is supplied to the FFT 212.

The FFT 212 performs Fourier transform on the received signal from which CP is removed so as to convert the time-series information to information in the frequency domain. The information in the frequency domain is supplied to the subcarrier demapping 214.

The subcarrier demapping 214 performs demapping in the frequency domain based on the supplied resource block number. The processing is performed corresponding to mapping in the frequency domain performed by each user apparatus. Also, the subcarrier demapping 214 may perform demapping based on the roll-off rate. The signal of the frequency domain on which demapping processing has been performed is supplied to the radio access scheme switch unit 216.

Based on the supplied radio access scheme switch signal, the radio access scheme switch unit 216 supplies the frequency domain signal on which demapping processing has been performed to the frequency domain equalization unit 218 when the radio access switch signal is a signal indicating the single-carrier scheme. Also, based on the supplied radio access scheme switch signal, the radio access scheme switch unit 216 supplies the frequency domain signal on which demapping processing has been performed to the channel equalization unit 222 when the radio access switch signal is a signal indicating the multicarrier scheme.

The frequency domain equalization unit 218 performs equalization processing in the frequency domain on the frequency domain signal on which demapping processing has been performed, based on the supplied channel estimation value. Then, the frequency domain equalization unit 218 supplies the signal on which equalization processing has been performed to the IDFT 220.

The IDFT 220 performs inverse discrete Fourier transform on the signal on which equalization processing has been performed. Then, the IDFT 220 supplies the signal on which inverse discrete Fourier transform has been performed to the radio access scheme switch unit 226.

The channel equalization unit 222 performs channel equalization processing on the frequency domain signal on which demapping processing has been performed, based on the supplied channel estimation value. Then, the channel equalization unit 222 supplies the signal on which channel equalization processing has been performed to the P/S 224.

The P/S 224 performs parallel serial conversion processing on the signal on which channel equalization processing has been performed. Then, the P/S 224 supplies the signal on which parallel serial conversion has been performed to the radio access scheme switch unit 226.

The radio access scheme switch unit 226 supplies the signal on which inverse discrete Fourier transform has been performed or the signal on which parallel serial conversion has been performed to the data demodulation unit 228.

The data demodulation unit 228 demodulates the signal on which inverse discrete Fourier transform has been performed or the signal on which parallel serial conversion has been performed based on the supplied transmission format. Then, the data demodulation unit 228 supplies the demodulated signal to the data decoding unit 230.

The data decoding unit 230 decodes the demodulated signal based on the supplied transmission format. As a result, transmission data is obtained.

(Other Transmission Power Determination Processing and Transmission Format Determination Processing)

Here, other transmission power determination processing in the transmission power determination unit 234 and other transmission format determination processing in the transmission format determination unit 236 are described.

It is assumed that PAPRs in the case when QPSK, 16QAM and 64QAM are applied as a modulation scheme and the multicarrier scheme is applied as a radio access scheme are P_A1, P_A2 and P_A3 dB respectively. In addition, it is assumed that PAPRs in the case when QPSK, 16QAM and 64QAM are applied as a modulation scheme and the single-carrier scheme is applied as a radio access scheme are P_B1, P_B2 and P_B3 dB respectively. In general, P_Ax>P_Bx (x=1, 2, 3), P_A1<P_A2<P_A3, P_B1<P_B2<P_B3 are satisfied.

Also, it is assumed that the maximum transmission power that the user apparatus UE can transmit without considering PAPR is P_max.

In this example, a case is described in which a radio access scheme, a transmission power and a modulation scheme are selected (determined) in this order.

(1) The radio access scheme is selected for each base station apparatus. For example, the radio access scheme is selected based on cell configuration.

(2) The base station apparatus 200 obtains an average reception SINR estimated from CQI information fed back from the user apparatus $100_n$ as SINR_ave.

(3) The base station apparatus 200 compares SINR_ave with a target SINR to determine a transmission power P1 of the user apparatus $100_n$ based on the comparison result. The target SINR may be different for each radio access scheme. For example, the base station apparatus 200 determines the new transmission power (P1(New)) by adding a value obtained by subtracting the target SINR(SINR0) from the average reception SINR(SINR_ave) to the past transmission power (P1(Old)). More particularly, the base station apparatus 200 determines the transmission power P1 by P1(New)=P1(Old)+(SINR_ave−SINR0).

(4) The base station apparatus 200 selects a modulation scheme based on instantaneous reception SINR estimated from CQI information based on the MCS selection table that is prepared beforehand corresponding to the selected radio access scheme. For example, the MCS table is prepared for each radio access scheme. For example, as shown in FIG. 8, an identifier of MCS corresponding to the reception SINR is specified.

When the multicarrier scheme is selected, the base station apparatus 200 selects the modulation scheme such that P1+P_Ax (x=1, 2, 3) does not exceed P_max. Also, when the single-carrier scheme is selected, the base station apparatus 200 selects the modulation scheme such that P1+P_Bx (x=1, 2, 3) does not exceed P_max.

Accordingly, the modulation scheme can be determined by the MCS determined based on the radio access scheme.

Also, as another example, a case is described where transmission power, access scheme and modulation scheme are selected in this order.

(1) The base station apparatus 200 obtains an average reception SINR estimated from CQI information fed back from the user apparatus $100_n$ as SINR_ave.

(2) The base station apparatus 200 compares SINK_ave with a target SINR to determine a transmission power P1 of the user apparatus $100_n$. The target SINR may be different for each radio access scheme. For example, the base station apparatus 200 determines the new transmission power (P1(New)) by adding a value obtained by subtracting the target SINR (SINR0) from the average reception SINR(SINR_ave) to the past transmission power (P1(Old)). More particularly, the base station apparatus 200 determines the transmission power P1 by P1(New)=P1(Old)+(SINR_ave−SINR0).

(3) The base station apparatus 200 determines a radio access scheme. For example, it is assumed that P2 is a constant larger than P_A1x. The base station apparatus 200 selects the single-carrier scheme when a value obtained by subtracting P2 from the maximum transmission power of the user apparatus $100_n$ is less than the transmission power P1 of the user apparatus $100_n$ (P_max−P2<P1). On the other hand, the base station apparatus 200 selects the multicarrier scheme when the transmission power P1 of the user apparatus $100_n$ is less than a value obtained by subtracting P2 from the maximum transmission power of the user apparatus $100_n$ (P1<P_max−P2).

(4) The base station apparatus 200 selects a modulation scheme based on instantaneous reception SINR estimated from CQI information based on the MCS selection table that is prepared beforehand corresponding to the selected radio access scheme. For example, the MCS table is prepared for each radio access scheme. For example, as shown in FIG. 8, an identifier of MCS corresponding to the received SINR is specified.

When the multicarrier scheme is selected, the base station apparatus 200 selects the modulation scheme such that P1+P_Ax (x=1, 2, 3) does not exceed P_max. Also, when the single-carrier scheme is selected, the base station apparatus 200 selects the modulation scheme such that P1+P_Bx (x=1, 2, 3) does not exceed P_max.

Accordingly, the modulation scheme can be determined by the MCS determined based on the radio access scheme.

(Communication Control Method)

The communication control method of the present embodiment is described with reference to FIG. 9.

The user apparatus $100_n$ sends a radio resource assignment request to the base station apparatus 200 (step S902). For example, when an uplink signal occurs, the user apparatus $100_n$ sends the radio resource assignment request to the base station apparatus 200 in order to transmit the uplink signal.

The base station apparatus 200 performs scheduling based on the radio resource assignment request transmitted by the user apparatus $100_n$. For example, the scheduler 202 performs scheduling based on QoS required for the uplink data transmitted by the user apparatus $100_n$, quality information of the uplink channel, path loss and the like. Then, when the base station apparatus 200 determines to assign a radio resource to the user apparatus $100_n$, the base station apparatus 200 determines the radio access scheme and the transmission power to be applied to the user apparatus $100_n$ (step S904). For example, the radio access scheme may be determined for each base station apparatus 200. When the radio access scheme is determined for each base station 200, the transmission power is determined based on the average reception SINR estimated from the CQI information reported from the user apparatus $100_n$.

The base station apparatus 200 determines the transmission format to be assigned to the user apparatus $100_n$ (step S906). For example, the base station apparatus 200 may select the modulation scheme based on the instantaneous reception SINR estimated from the CQI information reported from the user apparatus $100_n$, based on the MCS selection table prepared for each radio access scheme. In addition, the scheduler 202 may determine the roll-off rate using any one of the above-mentioned methods.

The base station apparatus 200 transmits the radio access scheme, the transmission power and the modulation scheme (step S906). For example, the base station apparatus 200 may transmit the radio access scheme, the transmission power and the modulation scheme using the physical downlink control channel. For example, the physical downlink control channel may include the L1/L2 control channel.

The user apparatus $100_n$ switches (sets) the radio access scheme based on the radio access scheme, the transmission power and the modulation scheme transmitted from the base station apparatus 200 (step S910). For example, the radio access switch unit 108 switches the mode to the radio access scheme that is reported.

The user apparatus $100_n$ transmits an uplink signal using the switched radio access scheme according to the reported modulation scheme and the transmission power (step S912).

The base station apparatus 200 performs receiving processing for the uplink signal transmitted by the user apparatus $100_n$ according to the radio access scheme and the modulation scheme determined in steps S904 and S906 (step S914).

In the above-mentioned embodiment, when it is determined that the user apparatus is caused to transmit the uplink signal using the multicarrier scheme, the roll-off rate may be defined to be zero on the system. By defining the roll-off rate to be zero on the system when it is determined that the user apparatus is caused to transmit the uplink signal using the multicarrier scheme, it is not necessary for the base station apparatus to report the roll-off rate when the base station apparatus determines to cause the user apparatus to transmit the uplink signal using the multicarrier scheme. Since it is not necessary to report the roll-off rate, information amount to be transmitted can be reduced. In addition, it is not essential to change the roll-off rate.

In the above-mentioned embodiment, only the transmission format may be determined or only the transmission power may be determined according to the radio access scheme. For example, in the case when only the transmission format is determined, the transmission power may be determined based on the average reception SINR estimated from CQI information transmitted from the user apparatus $100_n$ and the target SINR. Then, MCS may be selected based on the instantaneous reception SINR by referring to the MCS selection table prepared for each radio access scheme. In the case when MCS is selected based on the instantaneous reception SINR, the RF circuit converts the generated transmission signal into the radio frequency to transmit the signal. Also, for example, in the case when only the transmission power is determined, PAPR in the case when the MCS determined based on reception SINR is applied is obtained, and the transmission power may be determined based on the PAPR and the maximum transmission power of the user apparatus $100_n$ such that a value obtained by adding PAPR to the transmission power does not exceed the maximum transmission power.

Also, in the above-mentioned embodiment, the processing for determining the transmission power and/or the processing for determining the transmission format may be performed by the user apparatus. When the processing for determining the transmission power and/or the processing for determining the transmission format are (is) performed by the user apparatus, it becomes necessary to provide means (function) for reporting transmission power and/or transmission format applied to the user apparatus. Like the present embodiment, by performing the processing for determining the transmission power and/or the processing for determining the transmission format in the base station apparatus side, it can be realized without adding a new function to the user apparatus. Also, it is preferable that the processing is performed in the base station apparatus side in order to control user apparatuses that are manufactured by different manufacturers.

In the present embodiment, it is not necessary that both of the radio access schemes that are the single-carrier scheme and the multicarrier scheme are applied to the user apparatus. The above-mentioned processing for determining the transmission power and/or the processing for determining the transmission format may be performed for a user apparatus to which the radio access scheme of the multicarrier scheme is applied. Also, the above-mentioned processing for determining the transmission power and/or the processing for determining the transmission format may be performed for a user apparatus to which the radio access scheme of the single-carrier scheme is applied. By performing the processing for determining the transmission power and/or the processing for determining the transmission format for the user apparatus to which the radio access scheme of the single-carrier scheme is applied, the transmission power can be determined based on PAPR.

According to the present embodiment, the radio access scheme can be set in the uplink according to the environment to be supported. For example, the environment to be supported includes a cell configuration. Also, even when the multicarrier scheme is applied, it can be realized by adding S/P to a transmitter of the single-carrier scheme.

According to the present embodiment, transmission power control is performed according to the transmission power that is determined according to the radio access scheme set by the radio access scheme setting unit for setting the radio access scheme. Accordingly, the RF circuit can be made common irrespective of radio access schemes in the user apparatus. Therefore, adjustments for twice as much as analog circuits are not necessary.

According to the present embodiment, the transmission power is determined based on PAPR that is determined according to the radio access scheme. By determining the transmission power based on PAPR that is determined according to the radio access scheme, the transmission power can be determined based on different PAPRs according to radio access schemes.

According to the present embodiment, the transmission power is determined based on PAPR that is determined according to the modulation scheme. By determining the transmission power based on PAPR that is determined according to the modulation scheme, the transmission power can be determined based on different PAPRs according to modulation schemes.

According to the present embodiment, the transmission power is determined based on PAPR that is determined according to the radio resource scheduled for the user apparatus. By determining the transmission power based on PAPR that is determined according to the radio resource scheduled for the user apparatus, the transmission power can be determined based on different PAPRs according to radio resources scheduled for the user apparatus.

According to the present embodiment, modulation processing is performed on the channel-coded signal using a modulation scheme that is determined according to the radio access scheme to be set. By performing modulation processing using the modulation scheme that is determined according to the radio access scheme to be set, the modulation scheme can be determined according to the radio access scheme.

According to the present embodiment, channel coding is performed on the generated transmission data using a coding rate that is determined according to the radio access scheme to be set. By performing channel coding using the coding rate that is determined according to the radio access scheme to be set, the channel coding rate can be determined according to the radio access scheme.

For the sake of convenience of explanation, the present invention is described by being divided to some embodiments. But, classification into each embodiment is not essential in the present invention, and equal to or more than two embodiments may be used as necessary. The present invention has been described using specific numerals in order to facilitate understandings of the present invention, but unless specifically stated otherwise, these numerals are simply illustrative, and any other appropriate value may be used.

Although the present invention has been described with reference to specific embodiments, these embodiments are simply illustrative, and various variations, modifications, alterations, substitutions and so on could be conceived by those skilled in the art. For convenience, apparatuses according to the embodiments of the present invention have been described with reference to functional block diagrams, but the apparatuses may be implemented in hardware, software or combinations thereof. The present invention is not limited to the above-mentioned embodiment and is intended to include various variations, modifications, alterations, substitutions and so on without departing from the spirit of the present invention.

The present international application claims priority based on Japanese patent application No. 2008-215930, filed in the JPO on Aug. 25, 2008, and the entire contents of the Japanese patent application No. 2008-215930 is incorporated herein by reference.

LIST OF REFERENCE SYMBOLS 50 cell
$100_1$, $100_2$, $100_3$, $100_n$ user apparatus
102 transmission data generation unit
104 channel coding unit
106 data modulation unit
108 radio access scheme switch unit
110 serial parallel conversion unit
112 DFT-Spread OFDM processing unit
114 discrete Fourier transform unit (DFT)
116 subcarrier mapping unit
118 waveform shaping filter
120 inverse fast Fourier transform unit
122 CP adding unit
124 multiplexing unit
126 demodulation unit
128 decoding unit
130 RF circuit switch unit
132 single-carrier RF circuit
134 multicarrier RF circuit
136 transmission power control unit
138 RF circuit
200 base station apparatus
202 scheduler
204 uplink radio access scheme/resource block assignment information signal generation unit
206 OFDM signal generation unit
208 synchronization detection/channel estimation unit
210 CP removing unit
212 fast Fourier transform unit
214 subcarrier demapping unit
216 radio access scheme switch unit
218 frequency domain equalization unit
220 inverse discrete Fourier transform unit
222 channel equalization unit
224 parallel serial conversion unit
226 radio access scheme switch unit
228 data demodulation unit
230 data decoding unit
232 reception quality measurement unit
234 transmission power determination unit
236 transmission format determination unit
300: upper station
400: core network

The invention claimed is:

1. A user apparatus to which radio access schemes that are a single carrier scheme and a multicarrier scheme are applied, comprising:
   a radio access scheme setting unit configured to set a radio access scheme;
   a discrete Fourier transform unit configured to perform discrete Fourier transform on a modulated symbol sequence when the radio access scheme set by the radio access scheme setting unit is the single-carrier scheme;
   a serial parallel conversion unit configured to perform serial parallel conversion on a modulated symbol sequence when the radio access scheme set by the radio access scheme setting unit is the multicarrier scheme;
   a frequency domain signal generation unit configured to assign a radio resource to the modulated symbol sequence on which discrete Fourier transform has been performed by the discrete Fourier transform unit or to the modulated symbol sequence on which serial parallel conversion has been performed by the serial parallel conversion unit to generate a frequency domain signal;
   a transmission signal generation unit configured to perform inverse fast Fourier transform on the frequency domain signal generated by the frequency domain signal generation unit to generate a transmission signal;
   a transmission power control unit configured to perform transmission power control according to the radio access scheme set by the radio access scheme setting unit and to a radio resource scheduled for the user apparatus; and
   an RF unit configured to convert the transmission signal generated by the transmission signal generation unit to a radio frequency, and to transmit the transmission signal according to the transmission power control by the transmission power control unit,
   the user apparatus further comprising a waveform shaping filter configured to perform waveform shaping based on a roll-off rate determined by a base station apparatus,
   wherein when the radio access scheme set by the radio access scheme setting unit is the multicarrier scheme, the roll-off rate is zero, and when the radio access scheme set by the radio access scheme setting unit is the single-carrier scheme, the roll-off rate is a value determined based on a radius of a cell covered by the base station apparatus.

2. The user apparatus as claimed in claim 1, wherein the transmission power control unit controls the transmission power based on a peak-to-average power ratio (PAPR) determined according to the radio access scheme set by the radio access scheme setting unit.

3. The user apparatus as claimed in claim 2, wherein the transmission power control unit controls the transmission power based on PAPR determined according to a modulation scheme.

4. The user apparatus as claimed in claim 2, wherein the transmission power control unit controls the transmission power based on PAPR determined according to a radio resource scheduled for the user apparatus.

5. The user apparatus as claimed in claim 1, comprising:
a data modulation unit configured to perform modulation processing on a channel-coded signal using a modulation scheme determined according to the radio access scheme set by the radio access scheme setting unit.

6. The user apparatus as claimed in claim 1, wherein the transmission power control unit performs transmission power control based on a number of subcarriers or a size of a resource block that is assigned to the user apparatus.

7. The user apparatus as claimed in claim 1, wherein the radio access scheme is determined, by the base station apparatus, based on a distance between the base station apparatus and another base station apparatus located near the base station apparatus.

8. A user apparatus to which radio access schemes that are a single-carrier scheme and a multicarrier scheme are applied, comprising:
a radio access scheme setting unit configured to set a radio access scheme;
a data modulation unit configured to perform modulation processing on a channel-coded signal using a modulation scheme that is set according to the radio access scheme set by the radio access scheme setting unit;
a discrete Fourier transform unit configured to perform discrete Fourier transform on a symbol sequence modulated by the data modulation unit when the radio access scheme set by the radio access scheme setting unit is the single-carrier scheme;
a serial parallel conversion unit configured to perform serial parallel conversion on a symbol sequence modulated by the data modulation unit when the radio access scheme set by the radio access scheme setting unit is the multicarrier scheme;
a frequency domain signal generation unit configured to assign a radio resource to the modulated symbol sequence on which discrete Fourier transform has been performed by the discrete Fourier transform unit or to the modulated symbol sequence on which serial parallel conversion has been performed by the serial parallel conversion unit to generate a frequency domain signal;
a transmission signal generation unit configured to perform inverse fast Fourier transform on the frequency domain signal generated by the frequency domain signal generation unit to generate a transmission signal; and
an RF unit configured to convert the transmission signal generated by the transmission signal generation unit to a radio frequency, and to transmit the transmission signal,
the user apparatus further comprising a waveform shaping filter configured to perform waveform shaping based on a roll-off rate determined by a base station apparatus,
wherein when the radio access scheme set by the radio access scheme setting unit is the multicarrier scheme, the roll-off rate is zero, and when the radio access scheme set by the radio access scheme setting unit is the single-carrier scheme, the roll-off rate is a value determined based on a radius of a cell covered by the base station apparatus.

9. The user apparatus as claimed in claim 8, comprising:
a channel coding unit configured to perform channel coding on transmission data using a coding rate determined according to a radio access scheme set by the radio access scheme setting unit.

10. The user apparatus as claimed in claim 8, wherein the radio access scheme is determined, by the base station apparatus, based on a distance between the base station apparatus and another base station apparatus located near the base station apparatus.

11. A communication control method in a user apparatus to which radio access schemes that are a single-carrier scheme and a multicarrier scheme are applied, comprising:
a radio access scheme setting step of setting a radio access scheme;
a discrete Fourier transform step of performing discrete Fourier transform on a modulated symbol sequence when the radio access scheme set by the radio access scheme setting step is the single-carrier scheme;
a serial parallel conversion step of performing serial parallel conversion on a modulated symbol sequence when the radio access scheme set by the radio access scheme setting step is the multicarrier scheme;
a frequency domain signal generation step of assigning a radio resource to the modulated symbol sequence on which discrete Fourier transform has been performed by the discrete Fourier transform step or to the modulated symbol sequence on which serial parallel conversion has been performed by the serial parallel conversion step to generate a frequency domain signal;
a transmission signal generation step of performing inverse fast Fourier transform on the frequency domain signal generated by the frequency domain signal generation step to generate a transmission signal;
a transmission power control step of performing transmission power control according to the radio access scheme set by the radio access scheme setting step and to a radio resource scheduled for the user apparatus;
a transmission step of converting the transmission signal generated by the transmission signal generation step to a radio frequency, and transmitting the transmission signal according to the transmission power control by the transmission power control step; and
a waveform shaping filter step of waveform shaping based on a roll-off rate determined by a base station apparatus,
wherein when the radio access scheme set by the radio access scheme setting step is the multicarrier scheme, the roll-off rate is zero, and when the radio access scheme set by the radio access scheme setting step is the single-carrier scheme, the roll-off rate is a value determined based on a radius of a cell covered by the base station apparatus.

12. The communication control method as claimed in claim 11, wherein the transmission power control step performs transmission power control based on a number of subcarriers or a size of a resource block that is assigned to the user apparatus.

13. The communication control method as claimed in claim 11, wherein the radio access scheme set by the radio access scheme setting step is determined, by the base station apparatus, based on a distance between the base station apparatus and another base station apparatus located near the base station apparatus.

14. A communication control method in a user apparatus to which radio access schemes that are a single-carrier scheme and a multicarrier scheme are applied, comprising:

a radio access scheme setting step of setting a radio access scheme;

a modulation processing step of perform modulation processing on a channel-coded signal using a modulation scheme that is set according to the radio access scheme set by the radio access scheme setting step;

a discrete Fourier transform step of performing discrete Fourier transform on a symbol sequence modulated by the modulation processing step when the radio access scheme set by the radio access scheme setting step is the single-carrier scheme;

a serial parallel conversion step of performing serial parallel conversion on a symbol sequence modulated by the modulation processing step when the radio access scheme set by the radio access scheme setting step is the multicarrier scheme;

a frequency domain signal generation step of assigning a radio resource to the modulated symbol sequence on which discrete Fourier transform has been performed by the discrete Fourier transform step or to the modulated symbol sequence on which serial parallel conversion has been performed by the serial parallel conversion step to generate a frequency domain signal;

a transmission signal generation step of performing inverse fast Fourier transform on the frequency domain signal generated by the frequency domain signal generation step to generate a transmission signal;

a transmission step of converting the transmission signal generated by the transmission signal generation step to a radio frequency, and transmitting the transmission signal; and a waveform shaping filter step of waveform shaping based on a roll-off rate determined by a base station apparatus, wherein when the radio access scheme set by the radio access scheme setting step is the multicarrier scheme, the roll-off rate is zero, and when the radio access scheme set by the radio access scheme setting step is the single-carrier scheme, the roll-off rate is a value determined based on a radius of a cell covered by the base station apparatus.

15. The communication control method as claimed in claim 14, wherein the radio access scheme set by the radio access scheme setting step is determined, by the base station apparatus, based on a distance between the base station apparatus and another base station apparatus located near the base station apparatus.

16. A base station apparatus for performing communication with a user apparatus to which radio access schemes that are a single-carrier scheme and a multicarrier scheme are applied, comprising:

a radio access scheme setting unit configured to set a radio access scheme to be used by the user apparatus;

a transmission power setting unit configured to set transmission power of the user apparatus according to the radio access scheme set by the radio access scheme setting unit and to a radio resource scheduled for the user apparatus;

a reporting unit configured to report information indicating the radio access scheme set by the radio access scheme setting unit and transmission power set by the transmission power setting unit, wherein the base station apparatus determines a roll-off rate that is to be applied to the user apparatus to be zero when the radio access scheme set by the radio access scheme setting unit is the multicarrier scheme, and the base station apparatus determines the roll-off rate based on a radius of a cell covered by the base station apparatus when the radio access scheme set by the radio access scheme setting unit is the single-carrier scheme.

17. The base station apparatus as claimed in claim 16, wherein the transmission power setting unit sets the transmission power based on PAPR that is determined according to the radio access scheme set by the radio access scheme setting unit.

18. The base station apparatus as claimed in claim 16, wherein the transmission power setting unit sets the transmission power based on PAPR that is determined according to a modulation scheme.

19. The base station apparatus as claimed in claim 16, wherein the transmission power setting unit sets the transmission power based on PAPR that is determined according to the radio resource scheduled for the user apparatus.

20. The base station apparatus as claimed in claim 16, comprising:

a modulation scheme setting unit configured to set a modulation scheme to be applied to the user apparatus according to the radio access scheme set by the radio access scheme setting unit.

21. The base station apparatus as claimed in claim 16, comprising:

a channel coding rate setting unit configured to set a channel coding rate to be applied to the user apparatus according to the radio access scheme set by the radio access scheme setting unit.

22. The base station apparatus as claimed in claim 16, wherein the transmission power control unit performs transmission power control based on a number of subcarriers or a size of a resource block that is assigned to the user apparatus.

23. The base station as claimed in claim 16, wherein the radio access scheme setting unit determines the radio access scheme based on a distance between the base station apparatus and another base station apparatus located near the base station apparatus.

24. A base station apparatus for performing communication with a user apparatus to which radio access schemes that are a single-carrier scheme and a multicarrier scheme are applied, comprising:

a radio access scheme setting unit configured to set a radio access scheme to be used by the user apparatus;

a modulation scheme setting unit configured to set a modulation scheme to be applied to the user apparatus according to the radio access scheme set by the radio access scheme setting unit; and a reporting unit configured to report information indicating the radio access scheme set by the radio access scheme setting unit and the modulation scheme set by the modulation scheme setting unit, wherein the base station apparatus determines a roll-off rate that is to be applied to the user apparatus to be zero when the radio access scheme set by the radio access scheme setting unit is the multicarrier scheme, and the base station apparatus determines the roll-off rate based on a radius of a cell covered by the base station apparatus when the radio access scheme set by the radio access scheme setting unit is the single-carrier scheme.

25. The base station as claimed in claim 24, wherein the radio access scheme setting unit determines the radio access scheme based on a distance between the base station apparatus and another base station apparatus located near the base station apparatus.

26. A communication control method in a base station apparatus for performing communication with a user apparatus to which radio access schemes that are a single-carrier scheme and a multicarrier scheme are applied, comprising:

a radio access scheme setting step of setting a radio access scheme to be applied to the user apparatus;

a transmission power setting step of setting transmission power of the user apparatus according to the radio access scheme set by the radio access scheme setting step and to a radio resource scheduled for the user apparatus;

a reporting step of reporting information indicating the radio access scheme set by the radio access scheme setting step and transmission power set by the transmission power setting step; and a roll-off rate determining step of determining a roll-off rate that is to be applied to the user apparatus is zero when the radio access scheme set by the radio access scheme setting step is the multicarrier scheme, and the roll-off rate that is to be applied to the user apparatus is based on a radius of a cell covered by the base station apparatus when the radio access scheme set by the radio access scheme setting step is the single-carrier scheme.

27. The communication control method as claimed in claim 26, wherein the transmission power control step performs transmission power control based on a number of subcarriers or a size of a resource block that is assigned to the user apparatus.

28. The communication control method as claimed in claim 26, wherein the radio access scheme setting step determines the radio access scheme based on a distance between the base station apparatus and another base station apparatus located near the base station apparatus.

29. A communication control method in a base station apparatus for performing communication with a user apparatus to which radio access schemes that are a single-carrier scheme and a multicarrier scheme are applied, comprising:

a radio access scheme setting step of setting a radio access scheme to be applied to the user apparatus;

a modulation scheme setting step of setting a modulation scheme to be applied to the user apparatus according to the radio access scheme set by the radio access scheme setting step;

a reporting step of reporting information indicating the radio access scheme set by the radio access scheme setting step and the modulation scheme set by the modulation scheme setting step; and a roll-off rate determining step of determining a roll-off rate that is to be applied to the user apparatus is zero when the radio access scheme set by the radio access scheme setting step is the multicarrier scheme, and the roll-off rate that is to be applied to the user apparatus is based on a radius of a cell covered by the base station apparatus when the radio access scheme set by the radio access scheme setting step is the single-carrier scheme.

30. The communication control method as claimed in claim 29, wherein the radio access scheme setting step determines the radio access scheme based on a distance between the base station apparatus and another base station apparatus located near the base station apparatus.

* * * * *